United States Patent
Backström et al.

(10) Patent No.: US 9,916,808 B2
(45) Date of Patent: Mar. 13, 2018

(54) DISTRIBUTED DISPLAY DEVICE FOR VEHICLES AND AN OBJECT PROVIDED WITH A DISTRIBUTED DISPLAY DEVICE

(71) Applicant: BAE Systems Hägglunds Aktiebolag, Örnsköldsvik (SE)

(72) Inventors: Ronny Backström, Umeå (SE); Patrik Hägglund, Örnsköldsvik (SE)

(73) Assignee: BAE SYSTEMS HÄGGLUNDS AKTIEBOLAG, Örnsköldsvik (SE)

( * ) Notice: Subject to any disclaimer, the term of this patent is extended or adjusted under 35 U.S.C. 154(b) by 8 days.

(21) Appl. No.: 14/783,396

(22) PCT Filed: Apr. 8, 2014

(86) PCT No.: PCT/SE2014/050431
§ 371 (c)(1),
(2) Date: Oct. 8, 2015

(87) PCT Pub. No.: WO2014/168566
PCT Pub. Date: Oct. 16, 2014

(65) Prior Publication Data
US 2016/0071482 A1 Mar. 10, 2016

(30) Foreign Application Priority Data
Apr. 9, 2013 (SE) ...................................... 1350445

(51) Int. Cl.
*G09G 5/00* (2006.01)
*B60R 1/00* (2006.01)
(Continued)

(52) U.S. Cl.
CPC ............. *G09G 5/006* (2013.01); *B60K 35/00* (2013.01); *B60R 1/00* (2013.01); *G06F 3/1423* (2013.01);
(Continued)

(58) Field of Classification Search
CPC .... B60K 2350/1004; B60K 2350/1072; B60K 35/00; B60K 37/02; B64D 43/00;
(Continued)

(56) References Cited

U.S. PATENT DOCUMENTS 4,845,495 A * 7/1989 Bollard ................ G05D 1/0077
340/945
2008/0309474 A1* 12/2008 Okamoto ............... B60K 35/00
340/462
(Continued)

FOREIGN PATENT DOCUMENTS

| FR | 2960729 A1 | 12/2011 |
|---|---|---|
| WO | 2007/101654 A1 | 9/2007 |
| WO | 2013/127397 A1 | 9/2013 |

OTHER PUBLICATIONS

Extended European Search Report received for European Patent Application No. 14782246.4, dated Nov. 14, 2016, 5 pages.
(Continued)

*Primary Examiner* — Thomas Ingram
(74) *Attorney, Agent, or Firm* — Morrison & Foerster LLP

(57) ABSTRACT

The invention relates to a distributed display device for a vehicle comprising a set of subsystems, wherein said display device comprises at least one operator station, comprising at least one display unit arranged to receive and present information from at least one subsystem of a set of subsystems of the vehicle, wherein said at least one display unit comprises at least one dedicated safety critical input and at least one shared non safety critical input so as to be able to receive and present information from said at least one predetermined subsystem via at least one dedicated safety critical link and at least one shared non safety critical link.

23 Claims, 5 Drawing Sheets

(51) Int. Cl.
  *B60K 35/00* (2006.01)
  *G06F 3/14* (2006.01)
  *G07C 5/06* (2006.01)
  *G07C 5/12* (2006.01)
  *G09G 5/37* (2006.01)
  *G09G 5/377* (2006.01)

(52) U.S. Cl.
  CPC ............... *G07C 5/06* (2013.01); *G07C 5/12* (2013.01); *G09G 5/377* (2013.01); *B60K 2350/352* (2013.01); *G09G 2330/08* (2013.01); *G09G 2340/12* (2013.01); *G09G 2358/00* (2013.01); *G09G 2380/10* (2013.01); *G09G 2380/12* (2013.01)

(58) Field of Classification Search
  CPC ...... G01C 23/00; G06F 3/14; G09G 2340/10; G09G 2340/125; G09G 2360/02; G09G 2380/10; G09G 5/003; G09G 5/022; G09G 5/14
  See application file for complete search history.

(56) References Cited

U.S. PATENT DOCUMENTS

2010/0090868 A1   4/2010 Hall
2012/0136802 A1*  5/2012 McQuade .......... G06Q 30/0282
                                          705/347
2015/0015422 A1*  1/2015 Michaels .............. B64D 43/00
                                          340/973

OTHER PUBLICATIONS

International Preliminary Report on Patentability received for PCT Patent Application No. PCT/SE2014/050431, dated Oct. 22, 2015, 7 pages.
International Search Report and Written Opinion received for PCT Patent Application No. PCT/SE2014/050431, dated Jul. 23, 2014, 10 pages.
Intent to Grant received for European Patent Application No. 14782246.4, dated Sep. 18, 2017, 7 pages.

* cited by examiner

DISTRIBUTED DISPLAY DEVICE FOR VEHICLES AND AN OBJECT PROVIDED WITH A DISTRIBUTED DISPLAY DEVICE

CROSS REFERENCE TO RELATED APPLICATIONS

This application is a U.S. National Stage patent application of PCT/SE2014/050431, filed on Apr. 8, 2014, which claims priority to Swedish Patent Application No. 1350445-1, filed on Apr. 9, 2013, the entire contents of which are incorporated herein by reference.

FIELD OF THE INVENTION

The present invention relates to a distributed display device for vehicles. The present invention also relates to an object, such as a vehicle.

BACKGROUND OF THE INTENTION

Vehicles/vessels of today are becoming more and more complex and are provided with more and more subsystems for providing various kinds of functionality. This is particularly true regarding military vehicles/vessels such as military vehicles which today usually are provided with a number of subsystems, wherein many of these subsystems thus are provided with possibility for automatic and/or manual monitoring/controlling.

For providing monitoring/controlling of the subsystems the vehicles/vessels usually are provided, depending upon the configuration, with one or more operator stations, which comprises functionality allowing one or more operators of the vehicle/vessel to monitor/control one or more subsystems. Functionality for monitoring/controlling may for example comprise one or more display units, indicators and one or more activator means such as levers, steering wheels, joystick, computer mouse, keyboard, push buttons, touch screens.

Traditionally an operator station today is built up by integration of many separate components/systems such as computers, screens, control devices from various manufactures i.e. by a number of dedicated systems, such as dedicated MMI's (Man-machine-interfaces), each and one comprising dedicated display units and manoeuvre devices for controlling/monitoring respective subsystem, which are desired to be integrated in the vehicle. This is however ineffective in terms of costs and space. Further this creates problems for operators which hereby need to interact with a number of separate components/systems of the operator station to be able to monitor/control the different subsystems of the vehicle/vessel.

Consequently there is a need to present improvements regarding display systems for vehicles.

SUMMARY OF THE INVENTION

One object of the present invention is to achieve a distributed display device for vehicles which is fault-tolerant.

Another object of the present invention is to achieve a distributed display device for vehicles which allows flexibility.

Yet another object of the present invention is to achieve a distributed display device for vehicles which is cost effective.

Yet another object on the present invention is to achieve a distributed display device for vehicles which requires small space and presents low weight.

Another object of the present invention is to achieve a distributed display device for vehicles which in a robust and flexible way may manage presentation of safety critical information and to guarantee presentation of safety critical information.

These and other objects, which appears by the description below are achieved by means of a distributed display device for vehicles and an object and which further presents the features described below.

According to the invention the objects are achieved by a distributed display device for a vehicle comprising a set of subsystems, wherein said display device comprises at least one operator station of a first configuration, wherein said at least one operator station of the first configuration comprises at least one display unit arranged to receive and present information from at least one predetermined subsystem of said set of subsystems, wherein said at least one display device of said at least one operator station of the first configuration comprises at least one dedicated safety critical input and at least one shared non safety critical input so as to be able to receive and present information from said at least one predetermined subsystem via at least one dedicated safety critical link and at least one shared non safety critical link.

Hereby a flexible and robust display device is achieved which by having display units having at least two inputs, at least one shared and at least one dedicated, is made redundant during disappearance of the at least two inputs and/or associated link so that information still may be received by the remaining functioning input. Flexibility is further achieved by the display devices being provided with at least one shared connection which makes each display unit able to receive information from a plurality of subsystems. This provides that each display units may present information, such as predetermined operator adapted information from all subsystems of the vehicle. Robustness is further achieved by that the dedicated connection can be used for important information, such as safety critical information, and that the shared connection may be used for less important information, such as non-safety critical information, and/or for in some cases also safety critical information during disappearance of the dedicated connection. This allows various kinds of information in terms of criticality to be separated between the dedicated and shared connection. There is also achieved that each display unit in a safe way may be shifted between presenting information via the dedicated input and/or the shared input by for example controlling which input and/or which inputs should be active. This makes the display device able to meet demands on flexibility and safety. In other words integrated presentation of generic information from various sources with various grading's of system safety, such as safety critical, non-safety critical and security critical information without the grading is achieved, which requires safety demands on hardwares/softwares, affecting other parts of the system (the distributed display device and/or vehicle system). Further, integrated presentation of generic information from various sources is achieved without the demand that these sources have any mutual interface for information exchange. I.e. safety demands regarding parts which are presented depending upon which information respective parts are managing are not affecting other parts of the system.

According to an embodiment of the device said distributed display device comprises a plurality of information processing units, each and one being arranged to receive and process information from said at least one predetermined subsystem of said subsystem for generating and sending processed information via at least one of said at least one dedicated safety critical link said at least one shared non safety critical link of said at least one display unit of said at least one operator station of the first configuration for causing presentation of said processed information.

According to an embodiment of the device said at least two information processing units of said plurality of information processing units are arranged to provide substantially the same processed information for providing redundancy so that functionality may be maintained during a faulty conditions associated with one of the at least two information processing units. By providing a plurality of information processing units wherein at least two of these perform substantially similar function, i.e. providing substantially the same processed information, there is allowed to, when potential errors of an information processing unit occur, use information from one information processing unit having a corresponding function.

According to an embodiment of the device, processed information, sent from one or more of said plurality of information processing, which is received, in said at least one display unit of said at least one operator station, via said at least one shared non safety critical input, is presented overlaid and/or beside processed information received via said at least one dedicated safety critical input. By presenting information from various information sources, such as processed information from various information processing units which is received in the same unit there is achieved to effectively be able to separate the information from various information processing units so that the presentation provided in a display unit is manageable. As an example safety critical or other important information received via a dedicated connection is presented in a display unit together with other information received via a shared connection which is presented in an overlaid form and/or beside the safety critical information.

According to an embodiment of the device said distributed display device comprises at least one event monitoring unit arranged to detect and register at least one critical event based on information from sensors and/or any subsystems of said set of subsystems of the vehicle. By providing an event monitoring unit for detecting events associated with the vehicle or surroundings of the vehicle there is allowed to control the display device depending on the present situation.

According to an embodiment of the device said distributed display device comprises at least one display overriding unit arranged to receive information from the event monitoring unit, wherein the display overriding unit is configured for connection to at least one display overriding input, arranged at said at least one display unit and wherein said display overriding unit further is configured to send a signal to said at least one display overriding unit for causing said at least one display unit to shift from presenting a display representation of primary configuration to presenting a display representation of a secondary configuration associated with a detected critical event received from said event monitoring unit.

According to an embodiment of the device the signal sent from said at least one display overriding unit to said at least one display overriding input is arranged to electrically deactivate said at least one shared non safety critical unit of said at least one display unit in connection with a detected critical event. By providing a display overriding unit arranged to electrically deactivate one or more shared inputs of one or more display units it is possible to guarantee that a certain information amount, such as safety critical information from a particular information source during all the circumstances will be presented when a critical event occurs.

According to an embodiment of the device said at least one event monitoring unit is further arranged to register information indicating type of detected event. By in combination with registering critical events also register kind of event effective situation adoption is provided so that the information being presented in one or more display units may be adapted to various kinds of events. This may be achieved by that kind of event is associated with the information which is desired to be presented in one or more display units.

According to an embodiment of the device said at least one display overriding unit in connection to a detected critical event is arranged to a send signal indicating said kind of event to said at least one display overriding input for causing said at least one display unit to shift from presenting a display representation of a primary configuration to presenting a display representation of a secondary configuration chosen from a plurality of display representations of secondary configuration, based on said information indicating type of detected event, in connection with a detected critical event. By providing at least one display overriding unit to be able to shifting from a display representation, such as a display representation associated with a normal mode, to another display representation, such as a display representation associated with a critical mode, chosen from a plurality of other display representations it is possible to in a flexible and safe manner be able to adopt which information being presented in a display unit depending upon situation, i.e. detected event.

According to an embodiment of the device said at least one operator station of the first configuration comprises a plurality of display units, each one comprising at least one dedicated safety critical input and at least one shared non safety critical input.

According to an embodiment of the device said at least one dedicated safety critical input of each and one of that plurality of display units are configured for connection via a predetermined dedicated safety critical link to a predetermined information processing unit of said plurality of information processing units. According to this embodiment said at least one shared non safety critical input of each and one of said plurality of display units are further configured for connection to at least one predetermined information processing unit of said plurality of information processing units. By for each and one of the display units providing processed information via a dedicated connection from a predetermined information processing unit and processed information from further information processing units via a shared connection it is provided ability to present information received via the dedicated connection in a safe manner. It is further provided that several information processing units may be allowed to present processed information in one and the same display unit using the shared connection.

According to an embodiment of the device safety critical processed information generated by each and one of said plurality of information processing units is sent at least via said predetermined dedicated safety critical link to said at least one dedicated safety critical input of a predetermined display unit of said plurality of display units of said at least one operator station.

According to an embodiment of the device non safety critical processed information generated by each and one of said at least one information processing unit is sent via said at least one shared non safety critical input to said at least one shared non safety critical input of at least one of said plurality of display units of said at least one operator station.

According to an embodiment of the device said distributed display device comprises at least one user input unit arranged to allow for at least one operator of said distributed display device to interact with at least one of said subsystems and/or at least one of said plurality of information processing units.

According to an embodiment of the device said distributed display device comprises at least one fault detection unit arranged to detect the register faulty conditions of said distributed display device and/or at said subsystems. By providing at least one fault detection unit it is possible to detect faults of the vehicle or the display device, wherein operators may been made aware of errors and were errors may be fixed for example by using information generated from other parts in the system and/or by sending information via other communication paths of the display device.

According to an embodiment of the device said at least one shared non safety critical input is connected via at least one first network via at least one first switch to a plurality of said information processing units and/or a plurality of said subsystems. By providing at least one network simple distribution of information from one or more information sources is provided, such as subsystems/information processing units to a plurality of receivers, such as a plurality of display units of the distributed display device.

According to an embodiment of the device said distributed display device comprises a plurality of operator stations of the first configurations. By providing a plurality of operator stations there is provided a distributed display device which can present information for various vehicle operators, such as for different vehicle operators on different sites in the vehicle.

According to an embodiment of the device said distributed display device comprises at least one operator station of a second configuration, comprising at least one display unit arranged to receive and present information from at least one sub system of said set of subsystems, wherein said at least one display unit of said operator station of the second configuration comprises at least one shared non safety critical input for via at least one shared non safety critical link be able to receive and present information from said at least one subsystem. By providing at least one operator station of the second configuration, wherein this comprises at least one shared input, such as only one or more shared inputs and no dedicated inputs for via at least one shared link be able to receive and present from said at least one subsystem it is possible to provide an operator station with less components in a cost effective manner. Such an operator station is for example suitable for situations where the need of preventing safety critical information is low.

According to an embodiment of the device said at least one operator station of the second configuration comprises a plurality of display units, wherein each and one comprises at least one shared non safety critical input.

According to an embodiment of the device said at least one display unit further comprises at least one shared security critical input arranged to via at least one shared security critical link receive on forehand security critical information from at least one of said plurality of information processing unit. By providing a shared security critical input it is possible to separate the information which is security critical from other information.

According to an embodiment of the device said at least one shared security critical input is connected by via at least one second network via at least one second switch to a plurality of said information processing units and/or a plurality of said subsystems arranged to generate security critical information.

According to an embodiment of the device said at least one shared non safety critical input is a network interface or a data bus interface configured for connection to a network or a data base.

According to an embodiment of the device said at least one dedicated safety critical link is a link of any kind of link chosen from a set of kind of links comprising "Video Graphics Array" (VGA), "Digital Visual Interface" (DVI), High Definition Multimedia Interface (HDMI), Display Port and Low Voltage Differential Signalling interface (LVDS).

BRIEF DESCRIPTION OF THE DRAWINGS

The present invention will be further understood with reference to the following attached detailed description read together with the attached drawings, where the same reference numbers relate to similar parts throughout the many views, and in which.

DETAILED DESCRIPTION OF THE INVENTION

Figure 1:
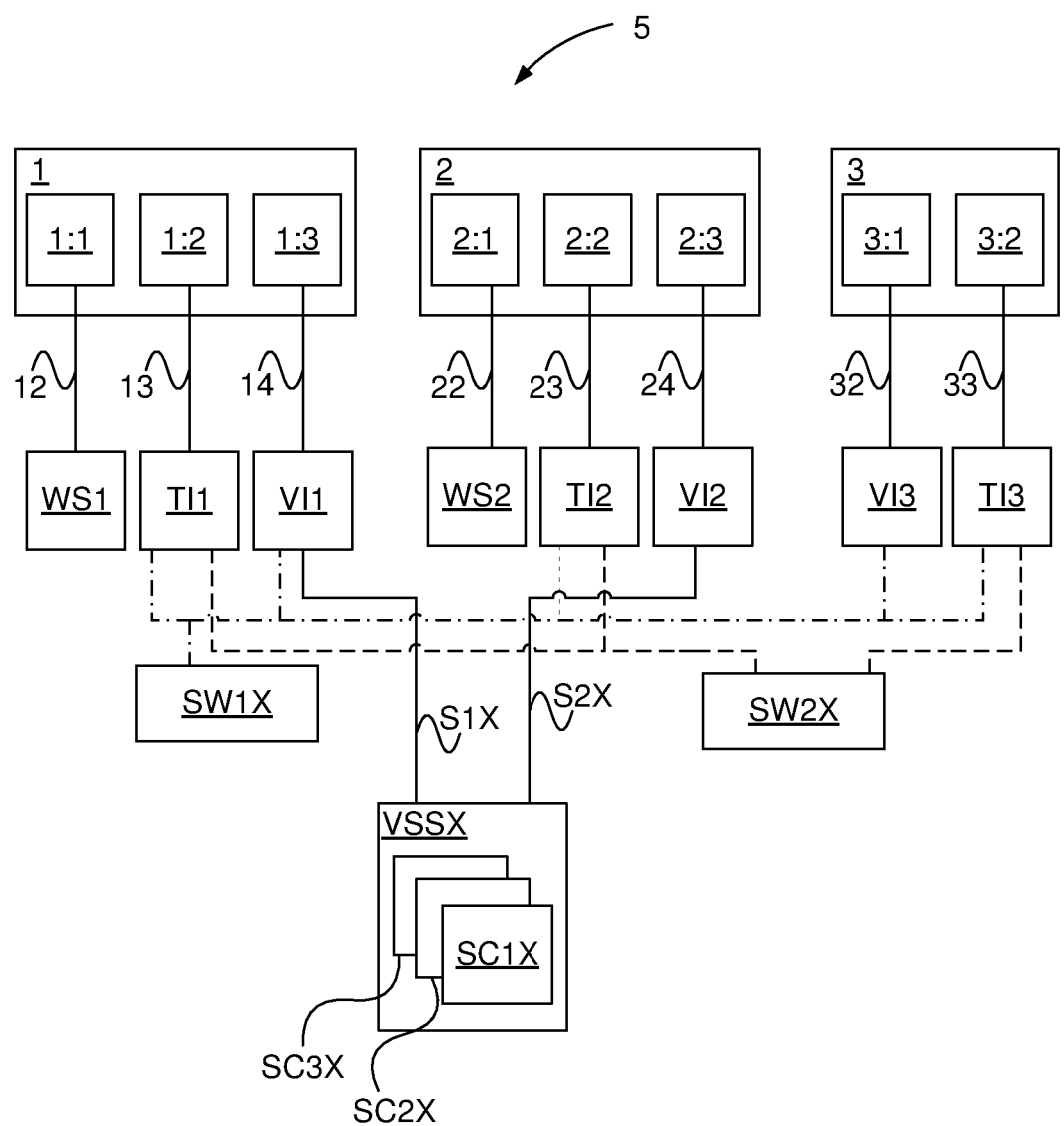
FIG. 1 schematically illustrates diagram of a distributed display system according to prior art.

Hearing the term link refers to a communication link which may be a physical wire, such as an optoelectronic communication wire, or a non-physical wire, such as a wireless connection, for example a radio or microwave link.

Herein the term "information type" refers to various types of classification of information, such as safety critical information, non-safety critical information and security critical information.

Herein the term "safety critical information" refers to information which is of safety critical character (eng. safety critical) in terms of continuous operation of the vehicle without any risk of damaging the vehicle and/or operators of the vehicle. Examples of such information may be information depicting incoming threats and information associated with management of weapon systems.

Herein the term "non-safety critical information" refers to information which is of other character than safety critical character.

Herein the term security critical information (eng. security critical) refers to information which is of sensitive nature in terms of which/whom should have/get access to information, examples of such information may be information about tactical aspects.

Herein the term "dedicated safety critical link" refers to a link which is only intended for communication between a first and second unit and where the information being communicated in said dedicated safety critical link only is of safety critical type.

Herein the term "shared non safety critical link" refers to a link which is intended for communication between a first unit and one or more other units and where the information being communicated is of one or more information types, such as non-safety critical type and/or safety critical type.

Herein the term "shared security critical link" refers to a link which is intended for communication between a first unit and one or more other units and where the information being communicated is of security critical type.

Herein the term "dedicated safety critical input" refers to an input, such as an interface, which is configured to receive information only from one single source, such as from one single unit, and wherein only information of safety critical type is received.

Herein the term "shared non safety critical input" refers to an input such an interface, which is configured to allow to receive information from one or more sources, such as from one or more sources/units and where information of non-safety critical and/or safety critical type is received.

Herein the term "shared security critical input" refers to an input, such as an input, which is configured to receive information from one or more sources/units, and wherein only information of security critical type is received.

Herein the term "information processing unit" refers to an information processing unit which is intended for providing processed information to one or more external units.

Herein the term "dedicated information processing unit" refers to an information processing unit which is only intended for providing processed information to one single external unit.

FIG. 1 schematically illustrates diagram of a distributed display system for a combat vehicle according to prior art.

The distributed display system 5 for a vehicle according to prior art comprises a plurality of operator stations 1, 2, 3 intended for various operators on the vehicle. The vehicle is in this case a combat vehicle, such as a tank. The operator stations allow for operators of the vehicle to monitor/control subsystems VSSX, such as a plurality of subsystems SC1X to SC3X of the vehicle. Examples of subsystems of the vehicle may be an aiming system, weapon system, fire control system, ventilation system and propulsion system. In this example a first operator station 1 is intended for a commander of the vehicle and a second operator station 2 is intended for a gunner and a third operator station 3 intended for a driver of the vehicle. Each operator station comprises a plurality of presentation terminals or display units 1:1 to 1:3, 2:1 to 2:3 and 3:1 to 3:3 arranged to receive and present information from said subsystems for allowing monitoring and/or controlling of said subsystem.

In greater detail a first display unit 1:1 of the first operator station 1 is arranged to receive and present information related to vehicle information data i.e. data representing characteristics, conditions of the vehicle. A second display unit 1:2 of the first operator station 1 is arranged to receive and present information relating to tactical information from tactical systems of the vehicle. A third display unit 1:3 of the first operator station 1 is arranged to receive and present information related to weapon systems from weapon systems of the vehicle. The second operator station 2 is configured so that a first display unit 2:1 of the second operator station is arranged to receive and present information relating to vehicle information data. A second display unit 2:2 of the second operator station 2 is arranged to receive and present information relating to tactical information from tactical systems of the vehicle. A third display unit 2:3 of the second operator system 2 is arranged to receive and present information related to weapon systems. The third operator system 3 is configured so that a first display unit 3:1 of the third operator station is arranged to receive and present information related to vehicle information data. A second display unit 3:2 of the third operator station 3 is arranged to receive and present information related to tactical information from tactical systems of the vehicle.

Each and one of said display units of said operator stations is connected to a dedicated information processing unit WS1 to WS2, TI1 to TI3, VI1 to VI3 each, via a respective dedicated link 12 to 14, 22 to 24, 32 to 33. Said dedicated link traditionally comprises a link of the type "Video Graphics Array" (VGA) or "Digital Visual Interface" (DVI). Said dedicated information processing unit associated with respective display unit comprises a processing unit such as a processor/graphic processor and/or graphics control unit and at least one memory unit, such as a "Random Access Memory" RAM and/or some other suitable memory device and a dedicated output and at least one dedicated or shared input for external connection.

In the illustrated sample with reference to FIG. 1 the distributed display system comprises eight different dedicated information processing units WS1 to WS2, TI1 to TI3, VI1 to VI3, i.e. a dedicated information processing unit for display unit 1:1 to 1:3, 2:1 to 2:3, 3:1 to 3:2. In greater detail the distributed display system comprises a first dedicated information processing unit WS1 arranged to receive and process information from weapon systems of the vehicle. The processed information from the first dedicated information processing unit WS1 is sent via a first dedicated link 12 to a dedicated input on the first display unit 1:1 of the first operator station 1. A second dedicated information processing unit TI1 of the distributed display system is arranged to receive and process information from tactical systems of the vehicle. The processed information from the second dedicated information processing unit TI1 is sent via a second dedicated link 13 to a dedicated input of the second display unit 1:2 of the first operator station 1. A third dedicated information processing unit VI1 of the distributed display system is arranged to receive and process information from vehicle systems of the vehicle. The processed information from the third dedicated information processing unit VI1 is sent via a third dedicated link 14 to a dedicated input of the third display unit 1:3 of the first operator station 1. A fourth dedicated information processing unit W12 of the distributed display system is arranged to receive and process information from weapon systems of the vehicle. The processed information from the fourth dedicated information processing unit W12 is sent via a fourth dedicated link 22 to a dedicated input of the first display unit 2:1 of the second operator station 2. A fifth dedicated information processing unit TI2 of the distributed display system is arranged to receive and process information from tactical systems of the vehicle. The processed information from the fifth dedicated information processing unit TI2 is sent via a fifth dedicated link 23 to a dedicated input of the second display unit 2:1 of the second operator station 2. A sixth dedicated information processing unit VI2 of the distributed display system is arranged to receive and process information from vehicle systems of the vehicle. The processed information from the sixth dedicated information processing unit VI2 is sent via a sixth dedicated link 24 to a dedicated input of the third display unit 2:3 of the second operator station 2. A seventh dedicated information processing unit VI3 of the distributed display system is arranged to receive and process information from vehicle systems of the vehicle. The processed information from the seventh dedicated information processing unit VI3 is sent via a seventh dedicated link 32 to a dedicated input of the first display unit 3:1 of the third operator station 3. An eighth dedicated information processing unit TI3 of the distributed display system is arranged to receive and process information from tactical systems of the vehicle. The processed information from the eighth dedicated information processing unit TI3 is sent via an eighth dedicated link 34 to a dedicated input of the second display unit 3:2 of the third operator station 3.

Said dedicated information processing units WS1 to WS2, TI1 to TI3, VI1 to VI3 are arranged to receive information from the subsystems of the vehicle to which the information processing units are configured to be connected to. The processed information which is sent from the dedicated information processing units to respective display units comprises information about control commandos for achieving a graphical presentation on respective display unit. Where said graphic presentation for respective display unit corresponds to a presentation of relevant information from predetermined subsystems of the vehicle i.e. depending on which subsystems which are connected to respective information processing unit. In greater detail said control commandos comprise information for causing said display units to present objects, such as text, symbols and video streams with associated attributes. Each and one of said object may have one or more of the following characteristics static, dynamic and/or interactive. These objects may also be updated in real time.

At least one of said dedicated information processing units such as the third VI1 and the sixth VI2 information processing units are arranged for connection via a link S1X, S2X to subsystem VSSX of the vehicle, such as to a plurality of subsystems SC1X to SC3X of the vehicle. Said dedicated information processing units, such as said first, second, fourth, fifth, seventh and seventh information processing units may also be configured for connection (not showed) to subsystem VSSX on the vehicle, such as to a plurality of subsystems SC1X to SC3X of the vehicle.

Said link S1X, S2X may comprise a link according to "Controller Area Network" (CAN) or RS-422 or other suitable standard.

In the illustrated example with reference to FIG. 1 the second and third information processing unit TI1 to TI2, VI1 to VI2 of each of the first and second operator station 1, 2 and first and the second information processing unit TI3, VI3 of the third operator station 3 are connected via a respective link, illustrated as a dash dotted line in FIG. 1, a first switch SW1X to a first network sharing of information. Further, the second information processing unit TI1 to TI2 of each of the first and second operator station 1, 2 and the second information processing unit TI3 of the third operator station 3 is connected via a respective link, illustrated as a dotted line in FIG. 1, to a second switch SW2X to a second network for sharing of information.

The first and second networks are of Ethernet type i.e. arranged according to "Institute of Electrical and Electronic Engineers" (IEEE) 802.3 standard.

A problem associated with the configuration of the distributed display system according to "prior art", i.e. according to FIG. 1, is that if an error occurs in some part to the distributed display system this will lead to a function disappearance which thereby makes it impossible for an operator of at least one of the operator stations 1 to 3 to monitor/control at least one subsystem of the vehicle. In greater detail an error of some part of the distributed display systems causes a function disappearance regardless if the error relates only to one of the following parts: the first or the second switches SW1X to SW2X, the dedicated links 12 to 14, 22 to 24, 32 to 33, the information processing units.

Further, the distributed display system according to "prior art" does not allow to present information from several information processing units in one and the same display unit because each and one of the display units are strictly connected to one single information processing unit via a dedicated link 12 to 14, 22 to 24, 32 to 33. This provides for example that if a gunner operating the second operator station wants to focus on the display unit which is arranged to present information from weapon systems of the vehicle, the gunner cannot review tactical information at the same time without moving the eyes to the display unit which is arranged to present tactical information.

Further, there is required at least one dedicated information processing unit per display unit, which makes the distributed display system according to prior art expensive, energy demanding, bulky and heavy.

Figure 2A:
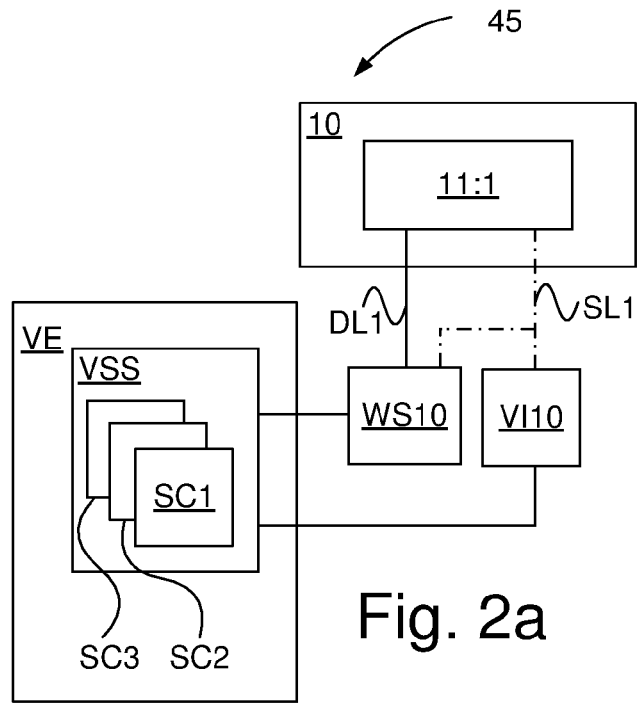
FIG. 2a schematically illustrates a diagram of a display device according to an embodiment of the invention.

FIG. 2a schematically illustrates a distributed display device 45 for a vehicle VE according to an embodiment of the present invention.

The distributed display device 45 comprises an operator station 10 of a first configuration, arranged for one or more operators of the vehicle VE, such as dedicated several different operators. The vehicle VE in this case is a combat vehicle, such as a tank. The operator stations of the first configurations allow operators of the vehicle to monitor/control at least one subsystems SC1 to SC3, such as a plurality of subsystems SC1 to SC3 of a set of subsystems VSS of the vehicle. Examples of subsystems which may be part of said set of subsystems of the vehicle may be an aiming system, weapon system, tactics system, fire control systems, ventilation systems and propulsion systems.

Said operator station of the first configuration comprises at least one presentation terminal, such as a display unit 11:1, arranged to receive and present information from said subsystems to allow monitoring and/or controlling of said subsystems.

According to an embodiment the distributed display device comprises a plurality of information processing units, such as at least two information processing units WS10, VI10, arranged to receive and process information. In greater detail each and one of said plurality of information processing units are arranged to receive and process information from at least one subsystem of said set of subsystems. Where said processed information relates to information regarding causing said at least one display unit 11:1 to present said information and/or parts of said information received from said at least one display system. Further details about functions of the information processing unit are depicted with reference to FIG. 2.

Said display system further comprises at least one dedicated safety critical input and at least one shared non safety critical input which are illustrated in greater detail with reference to FIG. 4. Said at least one dedicated safety critical input is arranged to receive information from said at least one subsystem of said set of subsystem or from a predetermined information processing unit WS10 of said at least two information processing units via a dedicated safety critical link DL1. In greater detail said dedicated safety critical input is arranged to only receive safety critical information. Said at least one shared non safety critical input is arranged to receive information from said at least one subsystem of said set of subsystems or from one or more of said at least two information processing units WS10, VI10 via a shared non safety critical link SL1. In greater detail said shared non safety critical input is arranged to receive non safety critical information and/or safety critical information from one or more of said at least two information processing units or said subsystem being part of said set of subsystems.

It should be noted that the distributed display device exemplified with reference to FIG. 2a may be configured differently. For example the distributed display device may comprise more components/units such as units which provide functionality for overriding display presentation for example as exemplified with reference to FIG. 4 and/or FIG. 5a-b.

Figure 2B:
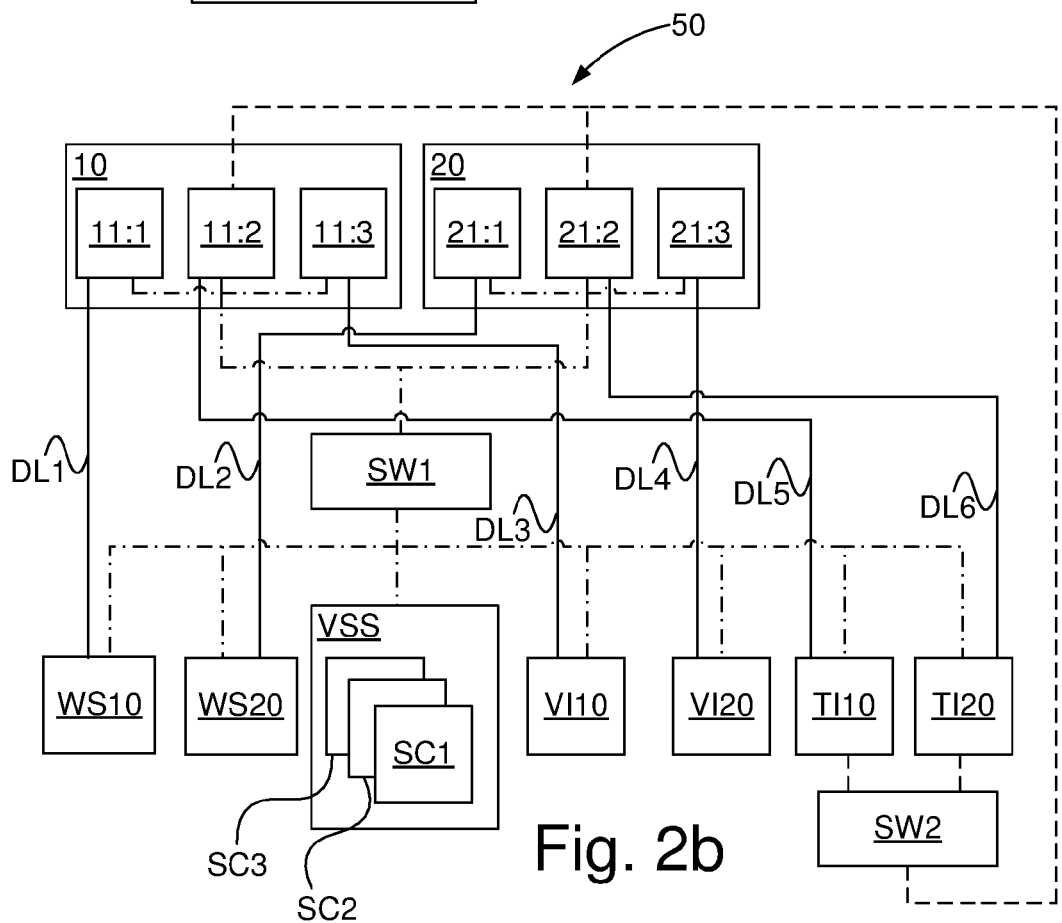
FIG. 2b schematically illustrates a diagram of a display device according to an embodiment of the invention.

FIG. 2b schematically illustrates a distributed display device 50 for a vehicle according to an embodiment of the invention.

The distributed display device 50 comprises at least one operator station, such as a plurality of operator stations 10, 20 of a first configuration arranged for one or more operators of the vehicle, such as dedicated several different operators. The vehicle in this case is a combat vehicle, such as a tank. The operator stations of the first configuration allow operators of the vehicles to monitoring/controlling at least one subsystem SC1 to SC3, such as a plurality of said systems SC1 to SC3 of a set of subsystems VSS of the vehicle. Examples of subsystems which may be part of said set of subsystems of the vehicle may be aiming systems, weapon systems, tactics systems, fire control systems, ventilation systems and propulsion systems. In the illustrated example with continued reference to FIG. 2b a first operator station 10 is arranged for at least one operator, such as a vehicle commander and a second operator station 20 which is arranged for at least one operator, such as a gunner and/or a driver. Each operator station of the first configuration comprises at least one presentation terminal, such as at least one display unit 11:1 to 11:3, 21:1 to 21:3 arranged to receive and present information from said subsystems for allowing monitoring and/or controlling of said subsystems.

According to an embodiment at least one of said plurality of said operator stations of the first configuration comprises a plurality of display units 11:1 to 11:3 and 21:1 to 21:3.

According to an embodiment each and one of said plurality of operator stations of the first configuration comprise a plurality of display units 11:1 to 11:3 and 21:1 to 21:3.

According to an embodiment each and one of said at least and/or plurality of display units of each operator station of the first configuration depending on configuration is arranged to receive and present information from at least one predetermined subsystem SC1 to SC3 of said set of subsystems for allowing monitoring and/or controlling of said at least one predetermined subsystem. Where said at least one predetermined subsystem is arranged/chosen depending on configuration and desired functionality of the distributed display system, i.e. depending on a number of operators, desired number of display units and number of operator stations together with which these display units should be arranged to receive and present information from which subsystems.

According to an embodiment each and one of said at least one and/or a plurality of display units of each operator station of the first configuration depending on configuration is arranged to receive and present information from a plurality of predetermined subsystems SC1 to SC3 of said set of subsystems for allowing monitoring and/or controlling of said at least one predetermined subsystem. Further a display unit of several different operator stations of the first configuration and/or several display units of one and the same operator station of the first configuration may be arranged to receive and present information from one and the same predetermined subsystem.

The distributed display device 50 further comprises according to an embodiment a plurality of information processing units WS10, WS20, TI10, TI20, VI10, VI20 arranged to receive and present information. In greater detail each and one of said plurality of information processing units is arranged to receive and present information from at least one subsystem of said set of subsystems. Where said processed information relates to information about causing one or more display units to present said information and/or parts of said information received from said at least one subsystem. Said processed information may also relate to the information intended to cause one or more display units to present refined information where refined information relates to processed information, such as modified/fusioned/calculated information based upon said received information from said at least one subsystem.

According to an embodiment at least one of said plurality of information processing units WS10, WS20, TI10, TI20, VI10, VI20 are arranged to not only provide processed information received from at least one subsystem but also arranged to receive raw data from said at least one subsystem and forwarding this to one or more display units for therein causing presentation of said raw data.

Each one of said plurality of information processing units WS10 to WS10, TI10 to TI130, VI10 to VI30 comprises a calculating unit such as a processor/graphics processor and/or graphic control unit and at least one storage unit, such as a Random Access Memory (RAM) and/or other suitable storage unit for allowing reception of information and processing of information. Said at least one information processing unit may also comprise software such as runnable program code stored on a storage unit, such as stored on at least one storage unit.

According to an embodiment the distributed display device 50 comprises a plurality of information processing units WS10, WS20, TI10, TI20, VI10, VI20, each and one being arranged to receive and process information from at least one subsystem of said set of subsystems.

According to an embodiment the distributed display device 50 comprises a plurality of information processing units WS10, WS20, TI10, TI20, VI10, VI20, wherein at least one information processing unit is arranged to receive and process information from a weapon system of the vehicle and at least one information processing unit is arranged to receive and process information from tactics systems of the vehicle and an information processing unit is arranged to receive and process information from vehicle systems.

The distributed display device 50 is configured so that each and one of said at least one display units 11:1 to 11:3, 21:1 to 21:3 of said plurality of operator stations of the first configuration comprises at least one dedicated safety critical input and at least one shared non safety critical input arranged to allow to receive information from at least one subsystem.

In greater detail each and one of said at least one display unit 11:1 to 11:3, 21:1 to 21:3 of said plurality of operator stations 10, 20 of the first configuration is arranged to allow to receive and present information from said at least one subsystem by receiving processed information from said at least one information processing unit WS10, WS20, TI10, TI20, VI10, VI20.

Said at least one dedicated safety critical input is configured for connection to at least one information processing unit via at least one dedicated safety critical link DL1 to DL6.

According to an embodiment said at least one dedicated safety critical link is part of a link of at least one type of a link chosen from a set of types of links comprising "Video Graphics Array" (VGA), "Digital Visual Interface" (DVI), "High-Definition Multimedia Interface" (HDMI), Display Port and Low Voltage Differential Signaling Interface (LVDS). Said at least one dedicated safety critical link may also be constituted by some other suitable standard for display units.

Said at least one shared non safety critical input is configured for connection to at least one information processing unit via at least one shared non safety critical link (illustrated as a dash dotted line, respectively dotted line in FIG. 2b).

According to an embodiment said at least one shared non safety critical input is configured for connection to a plurality of information processing units WS10, WS20, TI10, TI20, VI10, VI20 via said at least one shared link.

According to an embodiment said shared non safety critical input is constituted via an interface for connection to a database or a network.

According to an embodiment said at least one display unit 11:1 to 11:3, 21:1 to 21:3 of said plurality of operator stations 10, 20 of the first configuration comprises a plurality of shared non safety critical inputs, where each and one of said plurality of shared inputs allow to receive and present information from a plurality of information processing units.

According to an embodiment said at least one shared link is constituted by a link of the type "Ethernet" in combination with at least one first network comprising at least one first switch SW1. This embodiment relates to a configuration of said distributed display device where the total number, display units in the distributed display device which is arranged with at least one shared input exceeds two.

According to an embodiment said at least one shared non safety critical link is constituted by a link of some network link or database link of any for the application suitable protocol and/or any for the application suitable standard such as for example Token Ring, Ad-Hoc network or FDDI (Fibre Distributed Data Interface).

According to an embodiment the distributed display device further comprises at least one shared safety critical link connecting at least one of said plurality of information processing unit arranged to generate security critical information with at least one display unit of at least one of said operator station of the first configuration. Said shared security critical link may be formed by a second network and with an associated second switch SW2, where said at least one second network with associated switch SW2 is arranged to send on forehand said security critical information generated from at least one predetermined information processing unit to at least one predetermined display unit of at least one operator station of the first configuration. The at one least one second network may be constituted by an Ethernet network or other suitable network.

According to an embodiment at least one of said information processing units WS10, WS20, TI10, TI20, VI10, VI20 is configured for connection to at least one predetermined subsystem SC1 to SC3 of the set of subsystems VSS on the vehicle. Said connection which connects said at least one predetermined subsystem may be a shared connection such as, an Ethernet connection and/or a dedicated connection, such as a RS-422 connection.

In the illustrated example according to FIG. 2b the distributed display device 50 comprises six display units 11:1 to 11:3 21:1 to 21:3, wherein three display units 11:1 to 11:3 are arranged at a first operator station 10 of the first configuration and three display units 21:1 to 21:3 are arranged at the second operator station 20 of the first configuration. In greater detail the first operator station 10 of the first configuration of the distributed display device 50 comprises a first display unit 11:1, a second display unit 11:2 and a third display unit 11:3. The second operator station 20 of the first configuration of the distributed display device 50 comprises a fourth display unit 22:1, a fifth display unit 21:2 and a sixth display unit 21:3. In this example the distributed display device 50 further comprises six information processing units WS10, WS20, TI10, TI20, VI10, VI20. In greater detail the distributed display device 50 comprises a first information processing unit WS10 and a second information processing unit 20 arranged to receive and process information from weapon systems of the vehicle. The distributed display device 50 further comprises a third information processing unit VI10 and fourth information processing unit VI20 arranged to receive and process information from vehicle systems of the vehicle. The distributed display device 50 further comprises a fifth information processing unit TI10 and a sixth information processing unit TI20 arranged to receive and process information from tactical systems of the vehicle.

In the illustrated example with reference to FIG. 2b the first information processing unit WS10 is configured for connection to the first display unit 11:1 of the first operator station 10 via a first dedicated safety critical link DL1 for allowing to send processed safety critical information to the first display unit 11:1 of the first operator station 10. Further the first information processing unit WS10 is configured for connection via a shared non safety critical link to a predetermined set of display units of said plurality of display units 11:1 to 11:3, 21:1 to 21:3 of a plurality of said operator stations 10, 20 such as to all of said plurality of display units for allowing to send processed information to said predetermined set of display units. The second information processing unit WS20 is configured for connection to the fourth display unit 21:1 of the second of operator station 20 via a second dedicated safety critical link DL2 for allowing to send processed information to the fourth display unit 21:1 of the second operator station 20. Further the second information processing unit WS20 is configured for connection via a shared non safety critical link to a predetermined set of display units on said plurality of display units 11:1 to 11:3, 21:1 to 21:3 of a plurality of said operator stations 10, 20 such as to all of said plurality of display units for allowing to send processed information to said predetermined set of display units. The third information processing unit VI10 is configured for connection to a third display unit 11:3 of the first operator station 10 via a third dedicated safety critical link DL3 for allowing to send processed information to the third display unit 11:3 of the first operator station 10. Further the third information processing unit VI10 is configured for connection via a shared non safety critical link to a predetermined set of display units of said plurality of display units 11:1 to 11:3, 21:1 to 21:3 of a plurality of said operator stations 10, 20 such as to all of said plurality of display units for allowing to send processed information to said predetermined set of display units. The fourth information processing unit VI20 is configured for connection to the sixth display unit 21:3 of the second of the operator station 20 via a fourth dedicated safety critical link DL4 for allowing to send processed information to the sixth display unit 21:3 of the second operator station 20. Further the third information processing unit VI20 is configured for connection via a shared non safety critical link to a predetermined set of display units of said plurality of display units 11:1 to 11:3, 21:1 to 21:3 of a plurality of said operator stations 10, 20 such as to all of said plurality of display units for allowing to send processed information to said predetermined set of display units. The fifth information processing unit TI10 is configured for connection to the second display unit 11:2 of the first operator station 10 via a fifth dedicated safety critical link DL5 for allowing to send processed information to the second display unit 11:2 of the first operator station 10. Further the fifth information processing unit TI10 is configured for connection via at least one shared non safety critical link to a predetermined set of display units of said plurality of display units 11:1 to 11:3, 21:1 to 21:3 of the plurality of said operator stations 10, 20 such as to all of said plurality display units for allowing to send processed information to said predetermined set of display units. The sixth information processing unit TI20 is configured for connection to the fifth display unit 21:2 of the second operator station 20 via a sixth dedicated safety critical link DL6 for allowing to send processed information to the fifth display unit 21:2 of the second operator station 20. Further the sixth information processing unit TI20 is configured for connection via at least one shared non safety critical link to a predetermined set of display units of said plurality of display units 11:1 to 11:3, 21:1 to 21:3 of a plurality of said operator stations 10, 20 such as to all of said plurality of said operator stations 10, 20 such as to all of said plurality of display units for allowing to send processed information to said predetermined set of display units.

In the illustrated example with reference to FIG. 2 said shared non safety critical link of all information processing units WS10, WS20, TI10, TI20, VI10, VI20 is configured for connection to said first network via said switch SW1. Said shared non safety critical link of all said display units 11:1 to 11:3, 21:1 to 21:3 is further configured for connection to said first network via said first switch SW1. For allowing to receive information from said at least one subsystem SC1 to SC3, such as said plurality of subsystems SC1 to SC3 of said set of subsystems VSS of the vehicle said set of subsystems VSS is also configured for connection to said first network via said first switch SW1. Further said second and fifth display unit are configured to be connected to said fifth and sixth information processing unit TI10, TI20 via at least one shared security critical link, wherein said at least one shared security critical link is constituted of said second network with said second switch SW2. Further said second network in this example is arranged for communication of information generated by said fifth and sixth information processing units TI10, TI20 which is predetermined to be security critical.

It should be noted that said distributed display device 50 may be configured differently than the distributed display device which is exemplified in FIG. 2*b*. By example the distributed display device may comprise more or less information processing units, more or less links, more or less operator stations of the first configuration, more or less switches. Further the links associated to one or more of said information processing units and/or display units may be configured differently, for example in terms of type such as, High Definition Multimedia Interface (HDMI), Display port, or Low-voltage-display-signalling (LVDS) instead of VGA or DVI and also regarding which display units and information processing units should be connected by said links. Further said distributed display device 50 may comprise functionality for overriding a display presentation such as exemplified with reference to FIG. 4 and/or FIG. 5*a-b*.

Figure 3:
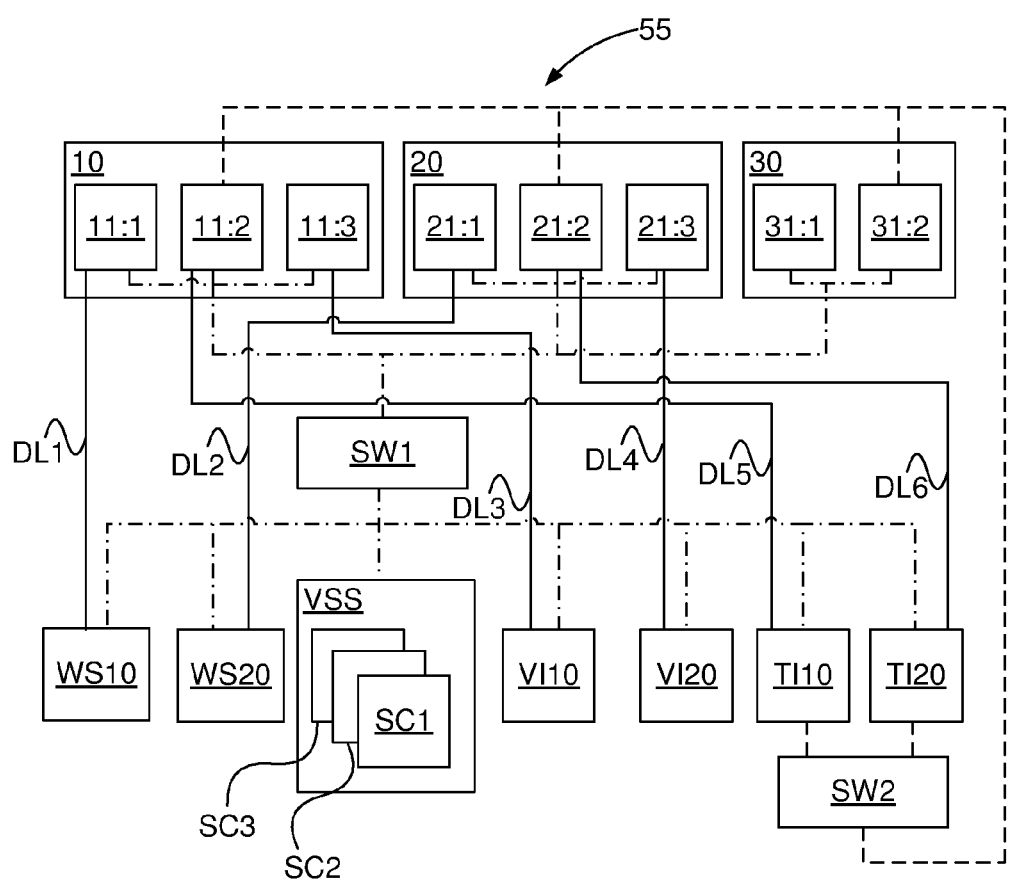
FIG. 3 schematically illustrates a diagram of a display device according to an embodiment of the invention.

FIG. 3 schematically illustrates a distributed display device 55 for a vehicle according to an embodiment of the present invention.

The distributed display device 55 differs from the distributed display device 50 according to FIG. 2 mainly by that the distributed display device 55 according to FIG. 3 except from comprising a plurality of operator stations of a first configuration 10,20 also comprises at least one operator station 30 of a second configuration.

According to an embodiment at least one operator station of the second configuration comprises a plurality of display units 31:1 to 31:2.

The distributed display device 55 is configured so that each and one of said at least one display unit 31:1 to 31:2 of said at least one operator station 30 of the first configuration comprises at least one shared non safety critical input arranged to allow to receive information from at least one subsystem.

Said at least one shared non safety critical input of each of one of said at least one display unit 31:1 to 31:2 of said at least one operator station 30 of the second configuration is configured for a connection to at least one information processing unit via at least one shared non safety critical link (illustrated as dash dotted, respectively dotted in FIG. 3).

According to an embodiment said at least one shared non safety critical input is configured for connection to a plurality of information processing units WS10, WS20, TI10, TI20, VI10, VI20 via said at least one shared non safety critical link.

According to an embodiment each and one of said at least one display unit 31:1 to 31:2 of said at least one operator station 30 of the second configuration comprises a plurality of shared inputs, where in each and one of said plurality of shared inputs allows receiving and presenting information from a plurality of information processing units.

According to an embodiment said at least one shared non safety critical link is constituted by a link of the type "Ethernet" in combination with at least one switch SW1.

In the illustrated example with reference to FIG. 3 the distributed display device 55 comprises a first and second operator station of the first configuration and a third operator station 30 of the second configuration. Said first operator station 10 is arranged for at least one operator, such as a vehicle commander, and said second operator station 20 is arranged for at least one operator, such as a gunner and said third operator station 30 is arranged for at least one operator, such as a driver.

In the illustrated example with reference to FIG. 3 the distributed display device 55 comprises eight pieces of display units 11:1 to 11:3, 21:1 to 21:3, 31:1 to 31:2 wherein three display units 11:1 to 11:3 are arranged at the first operator station 10 of the first configuration and three display units 21:1 to 21:3 are arranged at the second operator station 20 of the first configuration and two display units 31:1 to 31:2 are arranged at the third operator station 30 of the second configuration. In greater detail the first operator station 10 of the first configuration of the distributed display device 55 comprises a first display unit 11:1, a second display unit 11:2 and a third display unit 11:3. The second operator station 20 of the first configuration of the distributed display device 55 comprises a fourth display unit 21:1, a fifth display unit 21:2 and a sixth display unit 21:3. The third operator station 30 of the second configuration of the distributed display device 55 comprises a seventh display unit 31:1 and an eighth display unit 31:2. In this example the distributed display device 55, as similar to the distributed display device 50 exemplified in FIG. 2, comprises six information processing units WS10, WS20, TI10, TI20, VI10, VI20. Functionality of said six pieces of information processing units of the distributed display unit device 55 are configured in a similar way as the illustrated example with reference to FIG. 2. Also connections, associated to the distributed display device 55, in a form of dedicated, shared non safety critical links, switches connecting said six pieces of information processing units, said set of subsystems VSS and said plurality of display units of said first and second operator stations 10, 20 of the first configuration are configured in a similar way as distributed display device 50 exemplified with reference to FIG. 2. Further said at least one shared non safety critical input of said seventh and eighth display units 31:1, 31:2 of said third operator station 30 are configured for connection to said first network via said first switch SW1. Further said eighth display units 31:2 of said third operator station 30 comprises a shared security critical input, configured for connection to said second network via said second switch SW2.

It should be noted that said distributed display device 55 may be configured differently than the distributed display device which is exemplified in FIG. 3. For example the distributed display device may comprise more or less information processing units, more or less links, more or less operator stations of the first configuration and/or of the second configuration, more or less switches. Further the links associated with one or more of said information processing units and/or display units may be configured differently for example in terms of type such as, High Definition Multimedia Interface (HDMI) instead of VGA or DVI and also regarding which display units and information processing units should be connected by said links. Further at least one of said one networks with associated switch such as said second network with associated switch SW2 may be arranged to send on forehand security critical information generated from at least one predetermined information processing unit to at least one predetermined display unit of at least one operator station of the first and/or second configuration.

According to an embodiment said distributed display device 50, 55 according to any of the examples according to FIG. 2*a*, FIG. 2*b* and FIG. 3 is arranged for integration in a movable object such as a vehicle or a vessel. Said vehicle or vessel is preferable a ground combat vehicle such as a caterpillar band or wheel driven combat vehicle, such as a tank or a troop transport vehicle. Said vehicle or vessel may also be a naval vessel such as a destroyer or minesweeper. Said vehicle or vessel may also be an aircraft such a helicopter or fighter aircraft. Said vehicle or vessel may also be a civil vehicle or vessel.

According to an embodiment said distributed display device 50, 55 according to any of examples according to FIG. 2*a*, FIG. 2*b* or FIG. 3 is arranged for integration in an articulated vehicle, such as a counter pillar articulated vehicle.

According to an embodiment said distributed display device 50, 55 according to any of the examples according to FIG. 2*a*, FIG. 2*b* or FIG. 3 is arranged for integration in a stationary object such as a flight control tower or other stationary provided command central.

Figure 4:
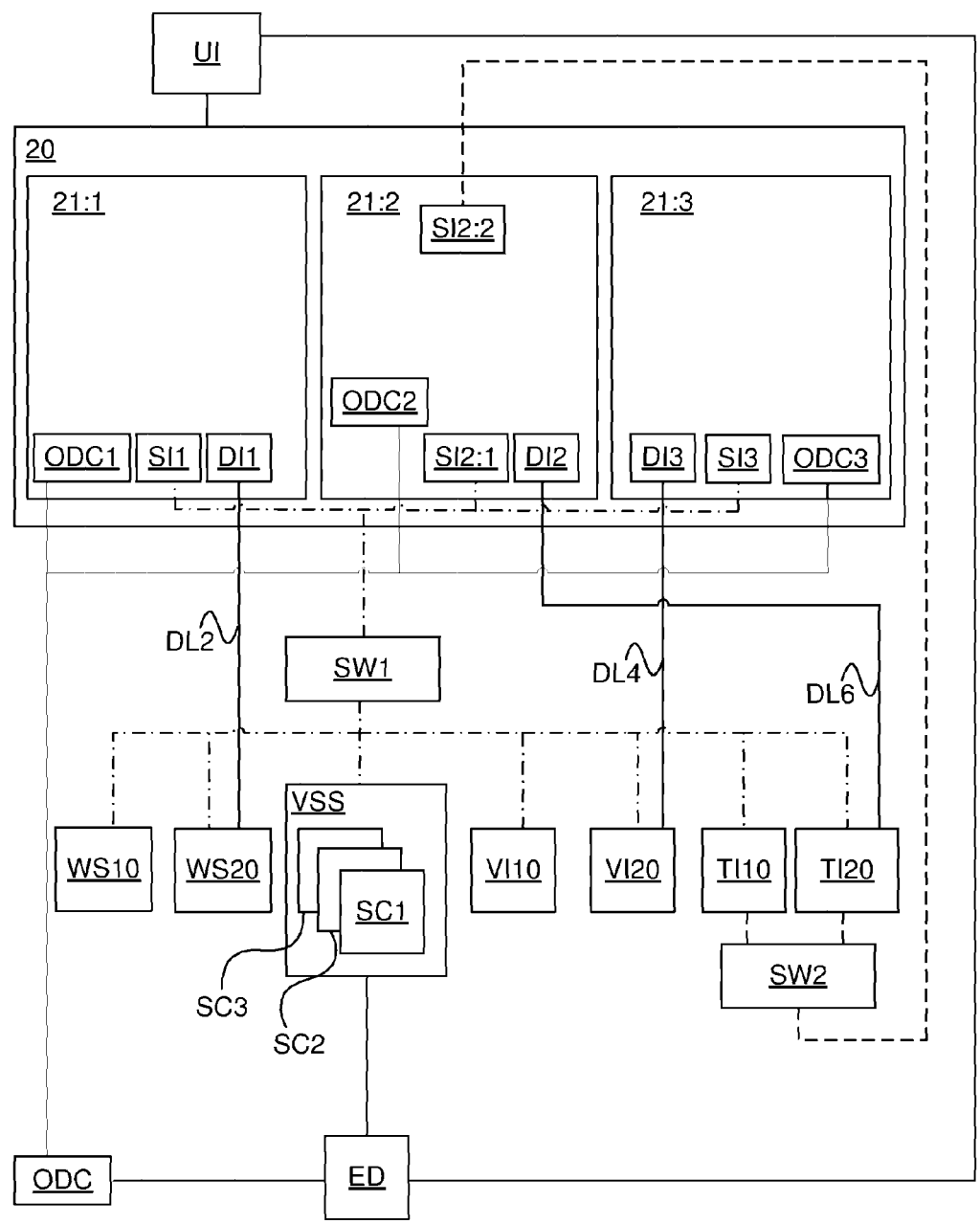
FIG. 4 schematically illustrates in greater detail a display device configured according to the display device in any of FIG. 2 or 3.

FIG. 4 schematically illustrates in greater detail the distributed display device 50, 55 exemplified in any of FIG. 2 or FIG. 3 according to an embodiment of the present invention.

By illustrative purposes with reference to FIG. 4 there is illustrated a distributed display device, such as a distributed display device according to any of the examples in FIG. 2*a*, FIG. 2*b* or FIG. 3, comprising at least one operator station 10, 20, 30 such as at least one second operator station 20 of the first configuration with associated at least one display unit 21:1, 21:2, 21:3. Said second operator station 20 may in a similar way as the distributed display device 50, 55 exemplified in any of FIG. 2*a*, FIG. 2*b* or FIG. 3 comprise one or more display units, such as said fourth, fifth and sixth display unit 21:1, 21:2 and 21:3. Further the distributed display device comprises a plurality of information processing units, such as said first, second, third, fourth, fifth and sixth information processing unit WS10, WS20, TI10, TI20, VI10, VI20 exemplified with reference to FIG. 2 or FIG. 3. Functionality of said information processing units of said distributed display device with reference to FIG. 4 are configured in a similar way as the illustrated example with reference to FIG. 2*b* or FIG. 3. Also connections, associated with the distributed display device, in form of dedicated, shared links, switches connecting said six pieces of processing information processing units, said subsystems SC1, SC2, SC3 of said set of subsystems VSS and said plurality of display units of said second operator station 20 of the first configuration are configured in a similar way as of the distributed display device exemplified with reference to FIG. 2*b* or 3.

Each and one of said at least one screens 21:1, 21:2, 21:3 of said operator station 20 of the second configuration comprises at least one dedicated safety critical input DI1, DI2, DI3, such as a dedicated safety critical input depicted with reference to FIG. 2*b* or FIG. 3, arranged to receive processed information from one information processing unit. Further each and one of said at least one screen 21:1, 21:2, 21:3 comprises at least one shared input SI1, SI2:1, SI2:2 and SI3, such as a shared non safety critical input detected with reference to FIG. 2*b* or FIG. 3, arranged to receive processed information from a plurality of said information processing units.

The illustrated example with reference to FIG. 4 said operator station 20 of the second configuration comprises three display units, such as said fourth, fifth and sixth display unit 21:1, 21:2, 21:3 exemplified with reference to FIG. 2*b* or FIG. 3. Said fifth display unit 21:1 is arranged with a first dedicated safety critical input DI1 and a first shared non safety critical input SI1. Said fifth 21:2 display unit is arranged with a second dedicated safety critical input DI2 and a second non safety critical and first shared security critical input SI2:1, SI2:2. Said sixth display unit 21:3 is arranged with a third dedicated safety critical input DI3 and a third shared non safety critical input SI3. Said first, second and third shared non safety critical input SI1, SI2:1, SI3 are configured for connection via respective shared links to all of said information processing units WS10, WS20, TI10, TI20, VI10, VI20 and at least one subsystem SC1 to SC3 of said set of subsystems VSS via a first network, such as a first network exemplified with reference to FIG. 2*b* or FIG. 3, for allowing reception of information from at least one of the units/subsystems. Said first shared security critical input SI2:2 is configured for connection via respective shared link to said fifth and sixth information processing units TI10, TI20 via a second network, such as the second network exemplified with reference to FIG. 2*b* or FIG. 3, for allowing reception of information from at least one of these units. Said first dedicated safety critical input DI1 is configured for connection via a dedicated safety critical link DI2, such as said second dedicated safety critical link DL2 exemplified with reference to FIG. 2b or FIG. 3, to said second information processing unit WS20, for allowing reception of information from said second information processing unit WS20. Said second dedicated safety critical input DI2 is configured for connection via a dedicated safety critical link DL6, such as said sixth dedicated link DL6 exemplified with reference to 2b or FIG. 3, to said sixth information processing unit TI20, for allowing reception of information from said sixth information processing unit 1120. Said third dedicated safety critical input DI3 is configured for connection via a dedicated safety critical link DL4, such as said fourth dedicated safety critical link DL4 exemplified with reference to FIG. 2b or FIG. 3, to said fourth information processing unit VI20, for allowing reception of information from said sixth information processing unit VI20.

According to an embodiment said dedicated safety critical input DI1, DI2, DI3 of each and one of said distributed display unit 21:1, 21:2, 21:3 is dedicated to receive safety critical information from said information processing unit to which said dedicated safety critical input is configured for connection via said dedicated safety critical link DL2, DL4, DL6. According to this embodiment said shared non safety critical input SI1, SI2:1, SI2:2, SI3 of each and one of said display units 21:1, 21:2, 21:3 is arranged to at least receive non safety critical information from at least one of said information processing units and/or subsystems SC1 to SC3 to which said shared non safety critical input is configured for connection via said shared link. Said safety critical information relates to information provided by subsystems and/or information processing units of safety critical character. Example of safety critical information may be information from sensors of the vehicle concerning incoming threats, information from tactics systems concerning surveillance regarding position of hostile/own forces, information from weapon systems regarding fire control and/or aiming means, information from vehicle systems comprising present status of systems which is of great importance for operation of the vehicle, etc. Example of non-safety critical information may be information from sensors of the vehicle regarding surrounding temperature, driven distance, video streams from a thermographic camera, information about own position indicated in an electronic map etc. Which type of information generated in which information source (for example information processing unit) is configured on beforehand so that it is determined which information is safety critical respectively non safety critical.

According to an embodiment said second operator station comprises a plurality of display units, such as a fourth, fifth and sixth display unit 21:1, 21:2, 21:3 exemplified with reference to FIG. 2b or FIG. 3, wherein each and one of said plurality of display units substantially arranged for presenting at least one predetermined display representation of a plurality of predetermined display representations. Each and one of said plurality of display representations comprises on forehand determined information from at least one predetermined information processing unit and/or from at least one subsystem SC1 to SC3. Display representations intended to be presented by said display units is depicted in greater detail with reference to FIG. 5a and FIG. 5b.

In the provided example with reference to FIG. 4 said fourth display unit 21:1 is arranged to present information from a predetermined information processing unit in form of said second information processing unit WS20, which is arranged to generate and send processed information associated to weapon systems of the vehicle, which is depicted with the illustrative examples with reference to FIG. 2b and FIG. 3. Further said fifth display unit 21:2 is arranged to present information from a predetermined information processing unit in form of said fourth information processing unit VI20, which is arranged to generate and send processed information associated with vehicle systems of the vehicle, which is depicted by the illustrative examples with reference to FIG. 2b and FIG. 3. Further said sixth display unit 21:3 is arranged to present information from a predetermined information processing unit TI20, which is arranged to generate and send processed information associated with tactics systems of the vehicle, which is depicted by the illustrative examples with reference to FIG. 2b and FIG. 3. It should be noted that even if each and one of said display units according to this example provides a display representation comprising predetermined information, i.e. presents information from a predetermined information processing unit, also information from other information processing units than said predetermined information processing unit is presented in respective display unit. For example information from said information processing unit may be presented overlaid parts of the information from said predetermined information processing unit. Alternatively said information from other information processing units may be presented beside information from said predetermined information processing unit as separate views, for example by one or more status rows. Alternatively both separate views and overlaid information may be used for presenting information from other information processing units than said predetermined information processing unit. This is depicted in greater detail with reference to FIG. 5a and FIG. 5b.

According to an embodiment said at least one second operator station 20 of said distributed display device comprises at least one user input unit UI arranged to allow at least one operator to provide information to at least one of said subsystems and/or said information processing units. This makes it possible for an operator to interact with and control systems, such as said subsystems SC1 to SC3 of the vehicle. Said user input unit UI may be constituted by suitable feeding means such as one or more screen buttons, stearing wheels, actuators, computer mice, joystick, keyboard or other suitable interactive user interfaces.

According to an embodiment said at least one user input unit UI is arranged for communication with at least one of said subsystems and/or said information processing units by using two way communication which is allowed by said shared inputs configured for connection to said subsystems and/or said information processing units via said shared links.

According to an embodiment said at least one user input unit UI is arranged for communication with at least one of said subsystems and/or said information processing units by being configured to be connected to at least one of said subsystems and/or said information processing units by at least one separate link (not showed).

According to an embodiment said that distributed display device comprises at least one event monitor unit ED arranged to detect events associated to said subsystems SC1 to SC3 of the set of subsystems VSS of the vehicle. These events may for example relate to events which have been registered by sensors or such detection means of said subsystem. This may be performed by said at least one event monitor unit ED monitoring information provided from said subsystems SC1 to SC3 of the vehicle and that said at least one event monitoring unit comprises information about which received information should result in a detected event. Said information of said at least one event monitoring unit ED based on which of said at least one event monitoring unit ED is arranged to detect an event may be constituted by predetermined threshold values, alarms etc. coming from one or more predetermined subsystems of the vehicle. In greater detail said event is formed by events which is critical in terms of what not may risk continued operation of the vehicle and/or safety for operators of the vehicle and/or other own forces. Examples of events which said at least one event monitoring unit ED is arranged to detect by monitoring information from different subsystems of the vehicle may be alarms about detected hostile forces close to the vehicle, alarms about incoming fire, alarms about an upcoming collision, alarms about overheating of engine, information from one or more sensors which indicate that an operator has interacted with a user input unit associated to controlling/monitoring of weapon systems of the vehicle etc. Upon detection of at least one event said at least one event monitoring unit is arranged to register said at least one event in at least one event monitoring unit together with information depicting what kind of event has been detected. Type of events relates to different types of events which is relevant for various kinds of subsystems, for example events related to and/or relevant for weapon systems. Information about registered events or information about registered events together with type of event is arranged to be used for allowing controlling of at least one display unit of at least one operator station concerning which information from which information processing unit(s) being presented and/or how this information is presented.

According to an embodiment said at least one event monitor unit ED is configured for connection to said user input unit UI, for allowing to register events associated with user interaction, for example associated with that the operator grabs weapon control devices.

According to an embodiment said at least one event monitor unit is, except for detecting critical events, arranged to detect errors of said distributed display device which causes function disappearance in at least some part of said distributed display device. This may be formed by said at least one event monitoring unit being configured for connection to at least some of said at least one of said at least one display unit of said at least one operator station, at least one of said at least one information processing unit, at least one of said at least one switch, at least one of said dedicated links, at least one of said shared links. Upon a detected error of the distributed display device the error is registered in said at least one event monitoring unit together with information depicting which part of the distributed display device the error is associated with. Information about registered errors is arranged to be sent from said at least one event monitor unit to at least one of said information processing units for allowing to via at least one information processing units reset correct functionality alternatively provide a function in an alternative way in the distributed display device.

According to an embodiment said distributed display device comprises at least one or more separate units arranged to detect errors in the distributed display device. According to this embodiment said at least one event monitor unit comprises no functionality for detecting errors of the distributed display device, as this functionality instead is found in one or more separate units arranged to detect errors.

According to an embodiment said at least one event monitor unit ED is constituted by a set of display units configured for connection to at least one of said information processing units. Said event monitor unit ED may also be configured for connection to further units/component, such as a plurality of said plurality of information processing units and/or at least one of following units/systems one or more of said subsystems SC1 to SC3, said at least one user input unit UI, one or more of said dedicated/shared links.

According to an embodiment said distributed display device comprises a plurality of event monitoring units ED, each and one being arranged to detect and register events associated to said distributed display device and/or said subsystem of the vehicle or selected parts thereof. Said plurality of event monitor units may for example be constituted by hardware and/or software integrated in one or more of said information processing units, user input unit UI, and/or subsystems on the vehicle.

According to an embodiment said distributed display device, such as said display device exemplified with reference to any of FIG. 2a, FIG. 2b or FIG. 3, comprises at least one display overriding unit ODC. Said at least one display overriding unit is arranged to allow controlling which information from said subsystem, and/or process information from said information processing units should be presented on which display unit. Said at least one display overriding unit ODC is configured for connection to said at least one event monitor unit ED for allowing to receive information about detected registered events or information about registered events in combination with type of detected registered event. According to this embodiment at least one of said display units of at least one operator station 10, 20 of the first configuration further comprises a display overriding input ODC1, ODC2, ODC3 configured for connection to said at least one display overriding unit ODC. Said at least one display overriding unit ODC is arranged to in connection to a dedicated registered event send a signal to at least one of said display overriding inputs of said at least one display unit of at least one of said operator stations 10, 20 of the first configuration. When the signal is received at said at least one display unit via said display overriding input said at least one display unit is arranged to control which information should be presented by electrically controlling hardware inputs in the form of said shared and dedicated inputs of respective display unit so that desired information depending on situation is presented i.e. depending on detected registered event. In greater detail said at least one display overriding unit ODC is configured for connection to at least said event monitor unit ED for receiving registered information regarding detected events or registered information regarding detected events together with type of events from said at least one event monitor unit ED. Based on said registered information from said at least one event monitor unit said at least one display overriding unit is arranged to regulate/control which information from said subsystem and/or processed information from said information processing units should be presented on which display unit by sending said signal to said display overriding input ODC1 to ODC3 of at least one display unit of at least one operator station of the first configuration.

According to an embodiment the signal which said at least one display overriding unit is arranged to send to said display overwriting input is an electrical signal. According to this embodiment said electrical signal is arranged to at said display unit in which said signal is received causing that said display unit controls the processed information being presented by said display unit following reception of said signal is electrically controlling said at least one shared non safety critical input so that this one is deactivated. This causes the processed information received via at least one shared non safety critical input not to be presented but instead only information received via said at least one dedicated safety critical input is presented.

According to an embodiment this signal is an electrical signal in form of a pulse with modulated signal.

According to an embodiment said at least one display overriding unit ODC is configured for connection to a display overriding input of a plurality of display units of at least one of said operator stations via dedicated safety critical connections.

According to an embodiment this signal which is sent from at least one display overriding unit is arranged to be indicative regarding what kind of event is detected and registered of said at least one event monitor unit have caused said at least one display overriding unit to send said signal. This may for an example be achieved by varying characteristics of said pulse with modulated electrical signal. According to this embodiment said at least display overriding unit ODC comprises information about what kind of event is relevant for which display unit of which operator station(s) of the first configuration. This is so that said at least one display overriding unit ODC can generate and send a signal being indicative for the detected registered event.

According to one embodiment at least one of said at least one display unit 21:1 to 21:3 of at least one operator station 20 of said operator stations of the first configuration comprises information for deciding which kind of event said signal sent from said at least one display overriding unit is indicative for.

According to an embodiment at least one of said at least one display units 21:1 to 21:3 of at least one operator station 20 of said operator stations of the first configuration comprises signal processing means, such as a field program of gate array (FPGA), arranged to based on said signal received from said at least one display overriding unit control which information amount received from said at least one shared connection should be presented depending on what kind of event said received signal is indicative for.

According to an embodiment said signal which is sent from said at least one display overriding unit ED is a digital or an analogue signal which upon reception of said display overriding input ODC1 to ODC3 affects software arranged at said display unit of at least one operator station of the first configuration so that this software controls which information should be presented depending on which detected registered event said signal is indicative for.

According to an embodiment said display device comprises functionality for error management by upon a detected error condition of said distributed display device re-route one or more information flows from one or more of said information processing units to one or more of said display units by using alternative information sources, such as alternative information processing units and/or alternative communication paths, such as alternative links. In case an error condition arises in one or more display units of at least one operator station, comprising a plurality of display units, where each and one of said plurality of display units is intended for presenting a certain kind of predetermined information, such as selected information from at least one predetermined information processing unit, also this kind of predetermined information may be re-routed from being presented in said one or more display units in which an error condition has arisen to instead being be presented in at least some of the remaining display units i.e. any of said plurality of display units which is not presenting an error condition. In greater detail said functionality for error management comprises means arranged to detect and register information associated with at least one error condition in association with that said at least one error condition arises in said distributed display device. Said registered information associated with said detected error condition comprises at least information about that an error condition has arisen and information depicting error source i.e. information depicting that an error condition has arisen and where in the distributed display device the error condition has arisen. For achieving re-routing following a detected error condition of said distributed display device said functionality for management may for an example be arranged to modify receiver addresses presented in a so called "point to multipoint" associated with a network protocol be arranged to be implemented in said at least one network. This may for example be implemented with the aid of one or more of said display overwriting units which in this example comprise functionality for modifying said receiver addresses depending upon received information indicating error conditions, error source and stored information depicting function and configuration regarding units/subsystems/links constituting said distributed display device. In greater detail said receiver addresses may be modified so that function disappearance following a detected error condition is taken care of by re-routing information flows with aid of information indicating alternative display units, information sources, communication paths for generating/communicating/presentation of said information flows. By example an error condition in a dedicated link intended to provide processed information from a predetermined information processing unit to a predetermined display unit of at least one of operator station could be managed by said functionality for error management in that said processed information instead of being sent by said dedicated link associated with an error condition is sent via said dedicated link associated with an error condition is sent via said at least one shared link to said predetermined display unit. This could be performed by modifying receiver addresses by adding a receiver address, indicating which units in the network are arranged to receive information, in the form of the address to said at least one shared input of said predetermined display unit.

Examples of error conditions may be function disappearance or partly error function of at least one dedicated/shared link, display unit, information processing unit, switch etc.

According to an embodiment said at least one event monitor unit comprises said means for detecting and register error conditions in the distributed display device. According to this embodiment said that at least one event monitor unit is configured for connection to that part and/or the parts of the distributed display device in which error detection is desired.

According to an embodiment said at least one distributed display device comprises one or more separate units (not shown) arranged with said means arranged for detecting and registering information associated with error conditions of parts of the distributed display device. These separate units may for an example constitute hardware and/or software integrated in the unit/subsystems which is desired to be provided with an error monitoring functionality.

This kind of error management functionality by means of re-routing is possible since said information processing units, such as said information processing units with reference to any of FIG. 2, FIG. 3, FIG. 4 are arranged as a redundant set of information processing units. This also holds true for error conditions associated with display units of operator stations which comprises a plurality of display units, wherein said plurality of display units form a redundant set of display units. In greater detail each and one of the examples with reference to FIG. 2a, FIG. 2b, FIG. 3, FIG. 4 depict that there are two information processing units associated to each kind of subsystem of the vehicle, i.e. two information processing units arranged for processing information from each kind of subsystem, such as weapon system, tactical systems and vehicle information systems.

In the case one or more information flows comprise safety critical information, from one or more of said information processing units, are re-routed when a detected error condition in a part of said distributed display devices is illustrated according to an embodiment an indication of the display unit to which re-routing has been performed about that safety critical information is sent via a non qualified link in said display unit to which re-routing of information has been performed.

It should be noted that the distributed display device illustrated with reference to FIG. 4 may be configured differently. For example more operator stations of the first and/or second configuration may be integrated in said distributed display device. Further said distributed display device depending upon configuration may be provided with more user input units for allowing more operators to communicate with subsystems SC1 to SC3 of the vehicle. In case the distributed display device is provided with more operator stations then the one illustrated with reference to FIG. 4 also these further operator stations, such as further operator stations exemplified in any of FIG. 2a, FIG. 2b or FIG. 3 may be configured and connected with the distributed display device in a similar way which is depicted with reference to FIG. 4. Further at least one of said information processing units may be configured for connection to said at least one display overriding unit ODC.

Figure 5A:
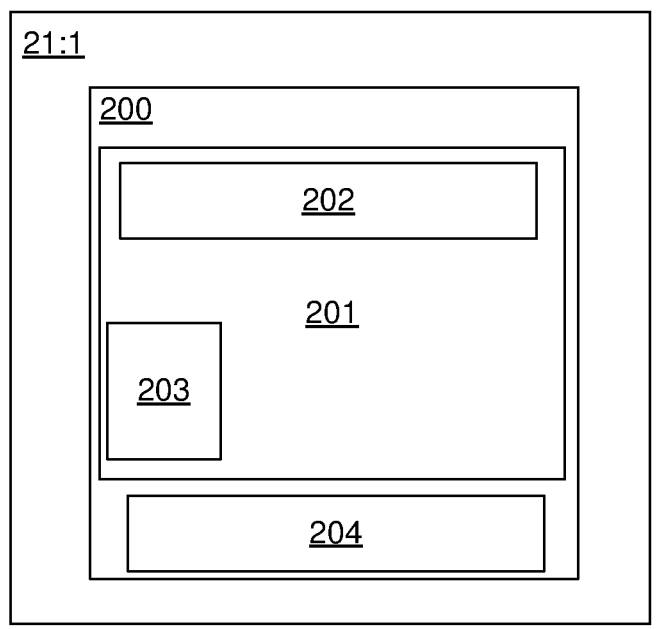
FIG. 5a schematically illustrates a first display representation arranged to be presented in a display device according to the display device in any of FIG. 2 or 3 according to an embodiment of the invention.

FIG. 5a schematically illustrates a display representation 200 of primary configuration according to an embodiment of the present invention.

Each and one of said at least one display units 11:1 to 11:3, 21:1 to 21:3, 31:1 to 31:2 of at least one of said operator stations 10, 20, 30 of the first and/or second configuration of said distributed display device, such as at said display device 45, 50, 55 exemplified with reference to FIG. 2a, FIG. 2b or FIG. 3 is arranged to provide at least one display representation 200 of primary configuration. Said at least one display representation 200 of primary configuration is arranged to be presented in respective display unit as standard i.e. when said respective display unit is operating in a normal mode. When a display unit is operating in a normal mode this gives that said at least one event monitor unit ED, exemplified with reference to FIG. 4, has not registered any event.

Said at least one display representation 200 of primary configuration is depending upon configuration arranged to present information from at least one predetermined subsystem SC1 to SC3 of said set of subsystems VSS and/or processed information from said at least one information processing unit WS10, WS20, TI10, TI20, VI10, VI20. Configuration in terms of which information said display representation 200 of primary configuration is arranged to present may also differ depending upon which display unit for which operator station said first display representation 200 is configured. For example a first display representation 200 of primary configuration may be arranged to present chosen information from a first information processing unit, such as selected information from said first information processing unit WS10 exemplified with reference to FIG. 2a, FIG. 2b or FIG. 3, and selected information from one further information processing unit, such as selected information from said fifth information processing unit TI10 exemplified with reference to FIG. 2a, FIG. 2b or FIG. 3. Further as an example a second display representation of primary kind may be arranged to present selected information from an information processing unit, such as selected information from said third information processing unit VI10 exemplified with reference to FIG. 2a, FIG. 2b or FIG. 3, and selected information from a further one information processing unit, such as selected information from said fifth information processing unit TI10 exemplified with reference to FIG. 2a, FIG. 2b or FIG. 3.

Configuration of said display representation 200 of primary configuration for each and one of said at least one display unit of each and one of said operator station 10, 20, 30 is configured on forehand based on which type of operator/role of operator each and one of said operator stations are intended for and based on number of display units each operator station comprises. In greater detail configuration of first display representation 200 for each and one of said at least one display unit of each and one of said operator stations 10, 20, 30 depends on which information an operator of respective operator station is in need of for in the best way be able to operate the vehicle with the associated subsystems.

In greater detail said at least one display representation 200 of primary configuration is configured to present at least one information field 201 to 204 comprising information from at least one predetermined subsystem SC1 to SC3 from said set of subsystems VSS and/or processed information from at least one predetermined information processing unit of said at least one information processing unit WS10, WS20, TI10, TI20, VI10, VI20.

In case said display representation of primary configuration is intended for a predetermined display unit of said plurality of display units said display representation of primary configuration comprises a number of information fields, each and one arranged to present information/processed information from one or more of said at least one predetermined subsystem and/or said at least one predetermined information processing unit so that said display representation of primary configuration is arranged to present information by using overlaying and/or separate views. By using overlaying and/or separate views information/processed information from several different subsystems/information processing units may be presented in an effective manner in one and the same display unit i.e. information field may even be presented as layers on other information fields or being presented in separate views beside other information fields. By using overlaying and/or separate views also various kinds of information, such as information detecting various entities generated from one and the same subsystem/information processing units may be presented in an effective way in one and the same display unit since this may be presented separately from each other.

According to an embodiment information arranged to be presented in at least one of said display units by said at least one display representation of primary configuration is arranged to be presented as separate views, i.e. information from various information sources, such as from different information processing units, presented on separate/dedicated parts of the physical display surface which said at least one display unit comprises.

According to an embodiment information arranged to be presented in at least one of said display units by said at least one display representation of primary configuration is arranged to be presented as overlaid views, i.e. information from different information sources, such as from different information processing units, may be presented as overlaid on each other on the physical display view surface which said at least one display unit comprises.

According to an embodiment each and one of said at least one display unit 11:1 to 11:3, 21:1 to 21:3 of said at least one operator station 10, 20 of the first configuration operating in a normal mode is arranged to receive and present information associated with said first display representation 200 by receiving safety critical information from said at least one predetermined information processing unit via said at least one dedicated safety critical input and non-safety critical information from said at least one predetermined information processing unit, such as from a number of predetermined information processing units, via said at least one shared non safety critical input.

According to an embodiment said first display representation 200 is arranged to present safety critical information in a first information field, such as in a first information field 201. According to this embodiment non safety critical information is arranged to be presented in at least one separate view and/or overlaid view separate from said first information field. In greater detail said first display representation 200 may be arranged to provide presentation of non-safety critical information beside or at least partly on top of safety critical information.

In the illustrated example with reference to FIG. 5a there is illustrated said at least one display representation 200 of primary configuration in form of a first display representation 200 of primary configuration comprising four information fields 201 to 204, in form of a first 201, second 202, third 203 and a fourth 204 information field. Said second 202 and third 203 information fields are according to this example arranged to be overlaid on top of said first information field 201. Said forth information field 204 is arranged to be presented as a separate view beside, such as below, said first information field 201. According to this example said first display representation 200 of primary configuration is arranged for presentation in a predetermined display unit, such as in a predetermined display unit a form of said four display unit 21:1 exemplified with reference to FIG. 2b or FIG. 3, of a predetermined operator station, such as at said second operator station 20 exemplified in with reference to FIG. 2b or FIG. 3. In greater detail according to this example said second operator station 20, at which said fourth display unit 21:1 is arranged, is intended to present information to at least one operator in the form of at least one vehicle commander and/or at least one gunner. In greater detail in this example said fourth display unit 21:1 is arranged to present said first display representation 200 of primary configuration comprising on forehand selected information relevant for decision making/management of weapon systems of the vehicle. According to this example said first display representation 200 of primary configuration is thus arranged to cause said fourth display unit 21:1 to present selected information provided from at least one information source, such as provided from at least one of said first or second information processing units, which are arranged to receive and process information from weapon systems of the vehicle, such as depicted with reference to FIG. 2b, FIG. 3 or FIG. 4. Preferably said first display representation 200 of primary configuration is arranged to present information provided by said second information processing unit WS20, such as exemplified with reference to FIG. 2b, FIG. 3 or FIG. 4, because said second information processing unit WS20 is configured for connection to said fourth display unit 21:1 via a dedicated safety critical link.

With reference to the illustrated example with reference to FIG. 5a said information in form of processed safety critical information from said second information processing unit WS20 according to this example is arranged to be presented in said first information field 201. Further is said second information field 202 arranged to present non safety critical information in the form of processed non safety critical information from said second information processing unit WS20. Said third information field 203 is arranged to present information in form of processed information from said fifth information processing unit TI10 arranged to receive and process information from tactical systems of the vehicle, such as depicted with reference to FIG. 2, FIG. 3 or FIG. 4. Said fourth information field 204 is arranged to present information in form of processed information from said third information processing unit VI10 arranged to receive and process information from vehicle information systems of the vehicle, such as depicted with reference to FIG. 2a, FIG. 2b, FIG. 3 or FIG. 4.

It should be noted that said display representation 200 of primary configuration illustrated with reference to FIG. 5a may be configured differently. For example said display representation 200 of primary configuration may comprise more or less information fields. Said information fields may also be configured differently regarding different separate/overlaid views. Further other than the exemplified subsystems and/or information processing units may be arranged to present information, such as selected information in said information field. Further said display representation 200 of primary configuration may be individually adapted for respective display unit 11:1 to 11:3, 21:1 to 21:3, 31:1, 31:2 such as exemplified with reference to FIG. 2a, FIG. 2b, FIG. 3 or FIG. 4.

Figure 5B:
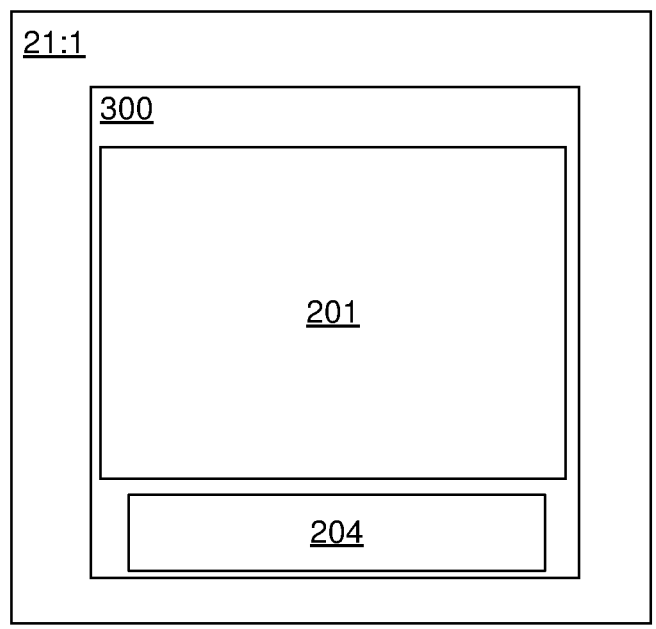
FIG. 5b schematically illustrates a second display representation arranged to be presented in a display device according to the display device in any of FIG. 2 or 3 according to an embodiment of the invention.

FIG. 5b schematically illustrates a display representation 300 of secondary configuration according to an embodiment of the present invention.

Each and one of said at least one display units 11:1 to 11:3, 21:1 to 21:3, 31:1 to 31:2 of at least one of said operator stations 10, 20, 30 of the first and/or second configuration of said distributed display device, such as at said display device 50, 555 exemplified with reference to FIG. 2 or FIG. 3, is arranged to provide at least one display representation 300 of secondary configuration. Said at least one display representation 300 of secondary configuration is arranged to be presented when a display unit operates in critical mode. That a display unit is operating in critical mode means that said at least one event monitor unit ED, exemplified with reference to FIG. 4, has registered at least one event.

In greater detail a registered critical event causes that at least one display unit of said plurality of display units of at least one operator station shifts from operation in normal mode to critical mode. When said at least one display unit changes from operation in normal mode to critical mode said at least one display unit shifts from presenting said at least one display representation 200 of primary configuration, such as exemplified with reference to FIG. 5a, to instead present said at least one display representation 300 of secondary configuration. Which of said plurality of said display units of at least one operator station shifts from operation in normal mode to critical mode may be controlled by using registered information in form of said information which depicts which type of event has been detected, which is registered together with the event, such as depicted with reference to FIG. 4. This means that one or more said plurality of display units of said at least one operator station of said distributed display device may be put in critical mode depending on which type of event has been detected. In case a detected registered event is relevant for operator interaction with weapon systems the one(s) of said plurality of display units being arranged to present information from weapon systems of the vehicle may be put in critical mode.

For controlling operation in critical respective normal mode said at least one display overriding unit ODC is arranged to receive information from said event monitor unit ED. When one or more of said at least one display overriding units receive information about a registered detected event said one or more of said at least one display overriding display units are arranged to cause at least one of said display unit to be put in critical mode by said at least one display overriding unit ODC sends a signal to at least one display overriding input ODC1 to ODC3 of at least one display unit of at least one operator station of the first configuration. Further said at least one display overriding unit is arranged to control the information being presented in said at least one of said display units by shifting from said at least one display representation 200 of primary configuration to said at least one display representation 300 of secondary configuration. This may be performed by said at least one display overriding unit is controlling at least one of said display units based on information depicting configuration of said display representation 300 of secondary configuration i.e. based on information indicating which information should be presented in said display representation 300 of secondary configuration.

According to an embodiment said at least one display representation 300 of secondary configuration is arranged to provide presentation of information in form of a selected subset of information fields which is arranged to be presented in at least one display unit by corresponding at least one display representation 200 of primary configuration such as said at least one display representation 200 of primary configuration exemplified with reference to FIG. 5a.

According to an embodiment said display representation 300 of secondary configuration is arranged to provide a display representation which is limited relative said display representation of primary configuration 200. This may for an example be performed by limiting the number of information fields which are arranged to provide non safety critical information. In greater detail said display representation 300 of secondary configuration may be arranged to include one or more of the information fields from corresponding display representation 200 of primary configuration, comprising non safety critical information provided from at least one information processing unit, where said excluded information either is provided as an overlay or as separate view. Said at least one or more information fields associated to said display representation 200 of primary configuration which is arranged to be excluded in said display representation 300 of secondary configuration is predetermined and may be of the type side view and/or overlaid.

According to an embodiment said at least one display representation 300 of secondary configuration is arranged to provide presentation of information in form of information fields only comprising safety critical information, where said safety critical information is provided from at least one predetermined information processing unit. In greater detail activating a critical mode following detected registered event causes that said display representation of secondary configuration 300 is presented instead of said display representation of primary configuration 200, where said display representation of secondary configuration in this embodiment is limited to present safety critical information, regardless if said first display representation is arranged to present safety critical information together with non safety critical information or not.

According to an embodiment said distributed display device is arranged to provide a plurality of display representations 300 of secondary configuration for at least one said display units. Where the content in each and one of said plurality of display representations 300 of secondary configuration is different. For example the content in each and one of said plurality of display representations of secondary configuration may differ regarding which information from which subsystem/information processing unit being presented. According to this embodiment said at least one display overriding unit is arranged to based on information, registered by at said at least one event monitor unit, in form of said information which depicts which type of event has been detected selecting which display representation of said plurality of said display representation 300 of secondary configuration should be presented in said at least one of said display unit. Information representing the configuration regarding said plurality of said display representations 300 of secondary configuration is via according to this embodiment further arranged to be stored at said at least one display unit of at least one operator station of said plurality of operator stations. For allowing and determining which display representation of said plurality of said display representations of secondary configuration should be presented also information, representing which display representation of said plurality of display representation of secondary configuration corresponds to which type of event which has been registered of said at least one event monitoring unit ED is arranged to be stored at said at least one display unit of said at least one display unit of at least one operator station of said plurality of operator stations. In greater detail characteristics, indicating type of detected event, at the signal which said at least one display overriding unit is arranged to send is arranged to be stored. This is to allow to decide which display representation of said plurality of display representations of secondary configuration should be presented.

In the illustrative example with reference to FIG. 5b there is illustrated said at least one display representation 300 of secondary configuration in form of a first display representation 300 of secondary configuration comprising two information fields 201, 204, in form of a first 201, and a fourth 204 information field, which correspond to the first information field 201 and the fourth information field of the first display representation 200 of the first configuration exemplified with reference to FIG. 5a. In greater detail said first display representation 300 of secondary configuration is arranged to be presented in a predetermined display unit, such as a predetermined in form of said fourth display unit 21:1, instead of said first display representation 200 of the first configuration following a detected critical event registered by said event monitoring unit ED. Said critical event may for an example be an operator of the vehicle is gripping steering means associated with the systems of the vehicle or said one or more sensors are registering that hostile troop has been found. This allows the operator interacting with the fourth display unit to see information in form of processed safety critical information from said second information processing unit WS20 in said first information field and information in form of processed information from said third information processing unit VI10 arranged to receive and process information from the vehicle information systems of the vehicle, which is depicted with reference to FIG. 2a, FIG. 2b, FIG. 3 and FIG. 4. By effectively limiting the information content which respective operator sees to a minimum allows the operator to easier quick to get an overview of information relevant for dealing with the detected critical event instead of requiring monitoring a larger information content.

It should be noted that the illustrative examples with reference to FIG. 5a, FIG. 5b by reasons of illustrative purposes only display one representation 200 of primary configuration and one display representation 300 of secondary configuration intended for a predetermined display unit, such as intended for that fourth display unit 21:1 exemplified with reference to FIG. 2b or FIG. 3, of an operator station, such as second operator stations 20 exemplified with reference to FIG. 2b or FIG. 3. In a similar way as depicted with reference to FIG. 5a and FIG. 5b also further display representation 200 of primary configuration and secondary configuration may be configured for a plurality of different display units of a plurality of operator stations which constitute desired configuration of distributed display device such as for example according to FIG. 2b or FIG. 3.

According to an embodiment said event monitoring unit ED exemplified with reference to FIG. 4 is also arranged to detect and register information indicating when an earlier detected and registered event does not exist anymore. By providing information indicating when an earlier detected critical event has stopped to exist to said information processing unit said information processing unit allows to via said at least one display overriding unit shifting from to at least in a predetermined display unit presenting said display representation of secondary configuration to instead present said display representation of primary configuration.

The foregoing description of the preferred embodiments of the present invention is provided for illustrative and descriptive purposes. It is not intended or to restrict the invention to the variants described. Many modifications and variations will obviously be apparent to the one skilled in the art. The embodiments have been chosen and described to best explain the principals of the invention and its practical applications, and hence make it possible for specialists to understand the invention for various embodiments and with the various modifications appropriate for the intended use.

The invention claimed is:

1. A distributed display device for a vehicle comprising a set of subsystems, said display device comprising: at least one operator station of a first configuration, wherein said at least one operator station of the first configuration comprises at least one display unit arranged to receive and present information from at least one predetermined subsystem of said set of subsystems, said at least one display unit of said at least one operator station of the first configuration comprises, at least one dedicated safety critical input for only receiving safety critical information via a dedicated safety critical link, at least one shared non safety critical input for receiving non safety critical information and/or safety critical information via a shared non safety critical link, and at least one shared security critical input for receiving security critical information via at least one shared security critical link, so as to be able to receive and present information from said at least one predetermined subsystem via the dedicated safety critical link, the shared non safety critical link and the shared security critical link.

2. The distributed display device of claim 1, further comprising a plurality of information processing units, each being arranged to receive and process information from at least one predetermined subsystem of said subsystems for generating and sending processed information via at least one of said at least one dedicated safety critical link and said at least one shared non safety critical link of said at least one display unit of said at least one operator station of the first configuration for causing presentation of said processed information.

3. The distributed display device of claim 2, wherein at least two information processing units of said plurality of information processing units are arranged to provide substantially the same processed information for providing redundancy so that functionally may be maintained at an error condition associated with one of the at least two information processing units.

4. The distributed display device of claim 2, wherein processed information, sent from one or more of said plurality of information processing units, which is received, in at least one display unit of said of at least one operator station, via said at least one shared non safety critical input is presented overlaid and/or beside processed information received via said at least one dedicated safety critical input.

5. The distributed display device of claim 2, wherein said at least one shared non safety critical input is connected via at least a first network via at least one first switch to the plurality of said information processing units and/or a plurality of said subsystems.

6. The distributed display device of claim 1, further comprising at least one event monitor unit arranged to detect and register at least one critical event based on information from sensors and/or any subsystem of said set of subsystems of the vehicle.

7. The distributed display device of claim 6, further comprising at least one display overriding unit arranged to receive information from said event monitor unit, wherein said display overriding unit is configured for connection to at least one display overriding input, arranged at said at least one display unit and wherein said display overriding unit further is configured to send a signal to said at least one display overriding input for causing said at least one display unit to shift from presenting a display representation of primary configuration to presenting a display representation of secondary configuration associated with a detected critical event received from said event monitor unit.

8. The distributed display device of claim 7, wherein the signal sent from said at least one display overriding unit to said at least one display overriding input is arranged to electrically deactivate said at least one shared non safety critical input of said at least one display unit associated with a detected critical event.

9. The distributed display device of claim 6, wherein said at least one event monitor unit further is arranged to register information indicating a kind of detected event.

10. The distributed display device of claim 9, wherein said at least one display overriding unit associated with a detected critical event is arranged to send a signal indicating said kind of event to said at least one display overriding input for causing said at least one display unit to shift from presenting a display representation of primary configuration to present a display representation of secondary configuration selected from a plurality of display representations of secondary configuration, based on said information indicating kind of detected event, associated with a detected critical event.

11. The distributed display device of claim 1, wherein said at least one operator station of the first configuration comprises a plurality of display units, wherein each comprises at least one dedicated safety critical input and at least one shared non safety critical input.

12. The distributed display device of claim 11, wherein said at least one dedicated safety critical input of each of one of said plurality of display units is configured for connection via a predetermined dedicated safety critical link to a predetermined information processing unit of said plurality of information processing units wherein said at least one shared non safety critical input of each and one of said plurality of display units is configured for connection to at least one predetermined information processing unit of said plurality of the information processing units.

13. The distributed display device of claim 11, wherein safety critical processed information generated by each one of said plurality of the information processing units is sent at least via said predetermined dedicated safety critical link to said at least one dedicated safety critical input of a predetermined display unit of said plurality of display units of said at least one operator station.

14. The distributed display device of claim 11, wherein non safety critical processed information generated by each one of said at least one information processing units is sent via said at least one shared non safety critical link to said at least one shared non safety critical input of at least one of said plurality of display units of said at least one operator station.

15. The distributed display device of claim 1, further comprising at least one user input unit arranged to allow for at least one of operator of said distributed display device to interact with at least one of said subsystems and/or at least one of said plurality of information processing units.

16. The distributed display device of claim 1, further comprising at least one error detection unit arranged to detect and register error conditions of said distributed display device and/or said subsystems.

17. The distributed display device of claim 1, comprising a plurality of operator stations of the first configuration.

18. The distributed display device of claim 1, further comprising at least one operator station of a second configuration, comprising at least one display unit arranged to receive and present information from at least one subsystem of said set of subsystems, wherein said at least one display unit of said operator station of the second configuration comprises at least one shared non safety critical input for via at least one shared non safety critical link be able to receive and present information from said at least one subsystem.

19. The distributed display device of claim 1, wherein said at least one operator station of the second configuration comprises a plurality of displays, wherein each and one comprises at least one shared non safety critical input.

20. The distributed display device of claim 1, wherein said at least one shared security critical input is connected via at least a second network via at least one second switch to a plurality of information processing units and/or a plurality of said subsystems arranged to generate security critical information.

21. The distributed display device of claim 1, wherein said at least one shared non safety critical input is a network interface or a data bus interface configured for connection to a network or to a data bus.

22. The distributed display device of claim 1, wherein said at least one dedicated safety critical link is a link of at least a kind of link selected from a group consisting of "Video Graphics Array" (VGA), "Digital Visual Interface" (DVI), and "High-Definition Multimedia Interface" (HDMI), Display Port and Low-Voltage Differential Signaling Interface (LVDS).

23. A vehicle comprising a display, wherein the display device comprises; at least one operator station of a first configuration, wherein said at least one operator station of the first configuration comprises at least one display unit arranged to receive and present information from at least one predetermined subsystem of said set of subsystems, said at least one display unit of said at least one operator station of the first configuration comprises, at least one dedicated safety critical input for only receiving safety critical information via a dedicated safety critical link, at least one shared non safety critical input for receiving non safety critical information and/or safety critical information via a shared non safety critical link, and at least one shared security critical input for receiving security critical information at least one shared security critical link, as to be able to receive and present information from said at least one predetermined subsystem via the dedicated safety critical link, the shared non safety critical link and the shared security critical link.

* * * * *